(12) United States Patent
Shimada et al.

(10) Patent No.: US 9,714,055 B2
(45) Date of Patent: Jul. 25, 2017

(54) HOLE PLUG

(71) Applicant: NIFCO INC., Yokosuka-shi, Kanagawa (JP)

(72) Inventors: Natsuki Shimada, Yokosuka (JP); Atsushi Doi, Yokosuka (JP)

(73) Assignee: NIFCO INC., Yokosuka-shi, Kanagawa (JP)

(*) Notice: Subject to any disclaimer, the term of this patent is extended or adjusted under 35 U.S.C. 154(b) by 0 days.

(21) Appl. No.: 14/417,445

(22) PCT Filed: Jul. 29, 2013

(86) PCT No.: PCT/JP2013/070508
§ 371 (c)(1),
(2) Date: Jan. 26, 2015

(87) PCT Pub. No.: WO2014/021274
PCT Pub. Date: Feb. 6, 2014

(65) Prior Publication Data
US 2015/0197288 A1    Jul. 16, 2015

(30) Foreign Application Priority Data

Jul. 30, 2012 (JP) .................................. 2012-168542
Sep. 5, 2012 (JP) .................................. 2012-195585

(51) Int. Cl.
*B65D 39/04* (2006.01)
*B62D 25/24* (2006.01)
*B65D 43/06* (2006.01)

(52) U.S. Cl.
CPC .................................. *B62D 25/24* (2013.01)

(58) Field of Classification Search
CPC .......... B65D 43/02; B65D 2543/00425; B65D 2543/0049; B65D 77/2024; B65D 25/24
(Continued)

(56) References Cited

U.S. PATENT DOCUMENTS 3,851,794 A * 12/1974 Hehl .............................. 220/789
4,091,962 A *  5/1978 van Buren, Jr. ............... 220/326
(Continued)

FOREIGN PATENT DOCUMENTS

CN      1720176 A       1/2006
CN    201538365 U       8/2010
(Continued)

OTHER PUBLICATIONS

PCT, "International Search Report for PCT/JP2013/070508".
(Continued)

*Primary Examiner* — J. Gregory Pickett
*Assistant Examiner* — Niki M Eloshway
(74) *Attorney, Agent, or Firm* — Manabu Kanesaka

(57) ABSTRACT

A hole plug includes a plug main body including a head portion, a leg portion, and a flange portion; and a meltable member annularly covering a periphery of an opening portion, disposed between the flange portion and a panel, and melting when heated to seal between the opening portion and the flange portion. The meltable member includes an annular convex portion at a periphery thereof, which annularly projects in a thickness direction of the meltable member, and abuts against a tip portion of the flange portion when the meltable member thermally shrinks in such a way as to reduce a diameter toward a center of the opening portion.

13 Claims, 32 Drawing Sheets

(58) Field of Classification Search
USPC .................. 220/789, 790, 795, 359.4
See application file for complete search history.

(56) References Cited

U.S. PATENT DOCUMENTS

| | | | | |
|---|---|---|---|---|
| 4,290,536 A | * | 9/1981 | Morel | 220/789 |
| 4,363,420 A | * | 12/1982 | Andrews | 220/787 |
| 4,588,105 A | * | 5/1986 | Schmitz et al. | 220/787 |
| 5,071,022 A | | 12/1991 | Sick | |
| 5,454,479 A | * | 10/1995 | Kraus | 220/787 |
| 7,347,655 B2 | * | 3/2008 | Nagasawa et al. | 411/508 |
| 8,162,166 B2 | | 4/2012 | Nakazato | |
| 8,613,476 B2 | * | 12/2013 | Dominguez et al. | 296/1.06 |
| 2007/0108216 A1 | * | 5/2007 | Kurth et al. | 220/789 |
| 2008/0142517 A1 | * | 6/2008 | Nakazato | 220/201 |
| 2009/0078704 A1 | * | 3/2009 | Janke | 220/359.4 |

FOREIGN PATENT DOCUMENTS

| | | |
|---|---|---|
| CN | 101934823 A | 1/2011 |
| EP | 0400393 A1 | 12/1990 |
| FR | 2105169 A1 | 4/1972 |
| JP | H02-58166 U | 4/1990 |
| JP | H02-293278 A | 12/1990 |
| JP | H07-014692 U | 3/1995 |
| JP | H07-14692 Y2 | 4/1995 |

OTHER PUBLICATIONS

Europe Patent Office, "Search Report for European Patent Application No. 13825136.8," Oct. 5, 2016.

China Patent Office, "Office Action for CN 201380040515.8," Dec. 18, 2015.

* cited by examiner

HOLE PLUG

FIELD OF TECHNOLOGY

The present invention relates to a hole plug which prevents a separation of a flange portion from a meltable member by controlling a thermal shrinkage of the meltable member, and ensures water-tightness and a bonding property between the flange portion and the meltable member.

BACKGROUND ART

Conventionally, there is known a hole plug comprising a plug main body including a head portion, a leg portion, and a flange portion; and a meltable member (see lines 8-30 of right column on page 2 and FIGS. 1 to 4 of Patent Document 1).

The aforementioned conventional hole plug is inserted into an opening portion provided in a panel to be attached, and then, a vicinity of the opening portion is heated, so that the meltable member melts, and is filled up between the flange portion and the opening portion to seal between both portions (see from line 31 to the bottom line of right column on page 2 and FIGS. 5 and 6 of the Patent Document 1).

PRIOR ART DOCUMENT

Patent Document

Patent Document 1: Japanese Utility Model Publication No. H07-14692

SUMMARY OF THE INVENTION

Problems to be Solved by the Invention

In the aforementioned conventional hole plug, however, when the meltable member is heated, the meltable member thermally shrinks, and separates from a tip portion of the flange portion, so that there is a problem that the water-tightness or a bonding strength between the flange portion and the meltable member reduces.

There, the present invention is made in view of the problem that the aforementioned conventional technology has, and an object of the present invention is to control the thermal shrinkage of the meltable member so as to prevent the separation from the flange portion and to ensure the water-tightness and the bonding property between the flange portion and the meltable member.

Means for Solving the Problems

The present invention is made in order to obtain the aforementioned object, and the present invention has the following characteristics.

First, a hole plug has the following structures.

(1) Plug Main Body

A plug main body includes a head portion, a leg portion, and a flange portion.

The head portion has a diameter larger than that of an opening portion provided in a panel.

The leg portion extends from the head portion, and reduces a diameter to pass through the opening portion to sandwich the panel between the leg portion and the head portion.

The flange portion extends from the head portion toward the panel, and elastically abuts against the panel.

(2) Meltable Member

The meltable member annularly covers a periphery of the opening portion, is disposed between the flange portion and the panel, and melts when heated to seal between the opening portion and the flange portion.

Secondly, around the meltable member, there is formed an annular convex portion annularly projecting in a thickness direction of the meltable member, and abutting against a tip portion of the flange portion when the meltable member thermally shrinks in such a way as to reduce a diameter toward a center of the opening portion.

The present invention may have the following characteristic.

The annular convex portion projects higher than the tip portion of the flange portion, and at a time of thermal shrinkage, the annular convex portion is welded to the tip portion of the flange portion in such a way as to wrap the tip portion of the flange portion inward in a radial direction from an outer peripheral direction of the flange portion.

According to the preferred aspect, the annular convex portion of the meltable member projects higher than the tip portion of the flange portion, so that at the time of thermal shrinkage, the annular convex portion can be reliably welded to the tip portion of the flange portion in such a way as to wrap the tip portion of the flange portion inward in the radial direction from the outer peripheral direction of the flange portion.

The present invention may have the following characteristic.

First, the flange portion is formed in a suction disc form opening toward the panel.

Secondly, on an inner peripheral face of the tip portion of the flange portion, there is formed at least an embossment portion where the meltable member can be welded.

According to the preferred aspect, on the inner peripheral face of the tip portion of the flange portion, there is formed at least the embossment portion where the meltable member can be welded, so that a bonding strength between the flange portion and the meltable member can be improved furthermore.

The present invention may have the following characteristic.

First, the flange portion is formed in the suction disc form opening toward the panel.

Secondly, on an outer peripheral face of the tip portion of the flange portion, there is formed at least an embossment portion where the meltable member can be welded.

According to the preferred aspect, on the outer peripheral face of the tip portion of the flange portion, there is formed at least the embossment portion where the meltable member can be welded, so that the bonding strength between the flange portion and the meltable member can be improved furthermore.

The present invention may have the following characteristic.

First, the leg portion includes a locking piece extending toward the head portion in a fold-back shape, formed in an umbrella shape opening toward the head portion, and reducing a diameter to pass through the opening portion to sandwich the panel between the locking piece and the head portion.

Secondly, the locking piece is cut and divided in a plurality of divided pieces by slits.

Thirdly, in each divided piece, there is formed a notch portion penetrating inside and outside.

According to the preferred aspect, in the locking piece of the leg portion, there are formed the slits and the notch portions so as to reduce an insertion force of the leg portion.

The present invention may have the following characteristic.

A plurality of notch portions is provided in each divided piece.

According to the preferred aspect, there is provided the plurality of notch portions formed in the locking piece of the leg portion so as to furthermore reduce the insertion force of the leg portion.

Effect of the Invention

The present invention is formed as mentioned above, so that a thermal shrinkage of the meltable member is controlled so as to prevent a separation from the flange portion, and to ensure water-tightness and a bonding property between the flange portion and the meltable member.

Namely, according to the present invention, around the meltable member, there is formed the annular convex portion abutting against the tip portion of the flange portion at the time of thermal shrinkage, so that the thermal shrinkage of the meltable member can be controlled, so-called automatically.

Consequently, according to the present invention, on an outer peripheral portion of the flange portion, there reliably remains the meltable member so as to ensure the water-tightness and the bonding property between the flange portion and the meltable member.

Also, according to the present invention, water-tightness between the opening portion of the panel and the flange portion can be ensured as well.

Also, according to the present invention, at the time of thermal shrinkage, the annular convex portion formed around the meltable member is welded to the tip portion of the flange portion in such a way as to wrap the tip portion of the flange portion inward in the radial direction from the outer peripheral direction of the flange portion so as to improve the bonding strength between the flange portion and the meltable member.

BEST MODES OF CARRYING OUT THE INVENTION

First Embodiment in FIGS. 1 to 10

With reference to FIGS. 1 to 10, the first embodiment of the present invention will be explained.

Figure 1:
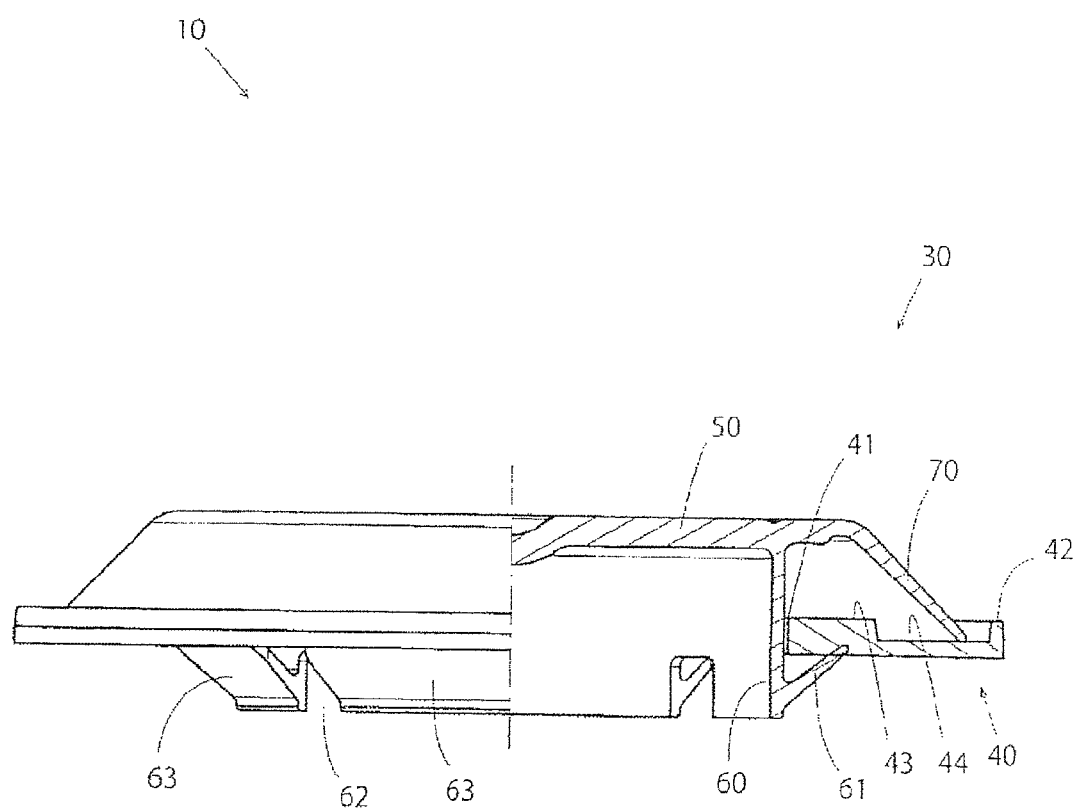
FIG. 1 is a side view of a hole plug wherein one-half thereof is shown as a cross-section in the first embodiment of the present invention.
Figure 2:
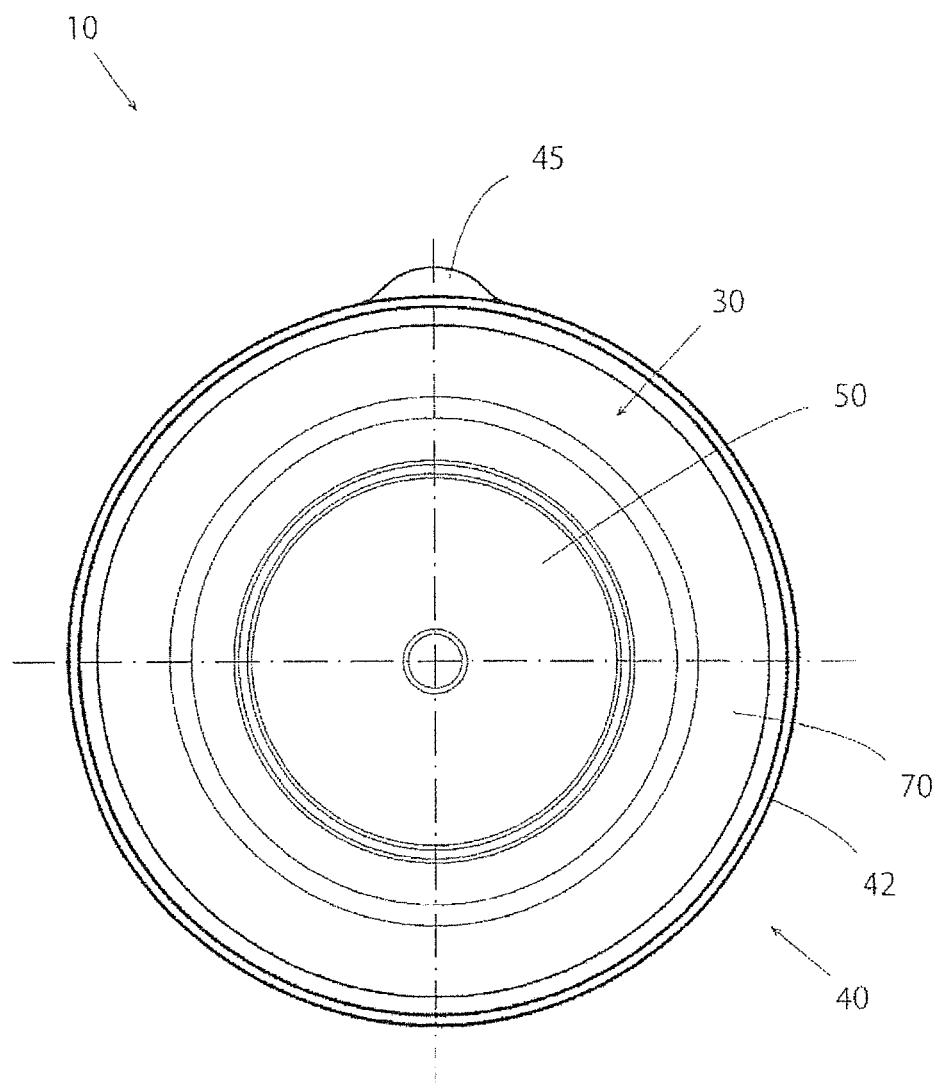
FIG. 2 is a plan view of the hole plug.
Figure 10:
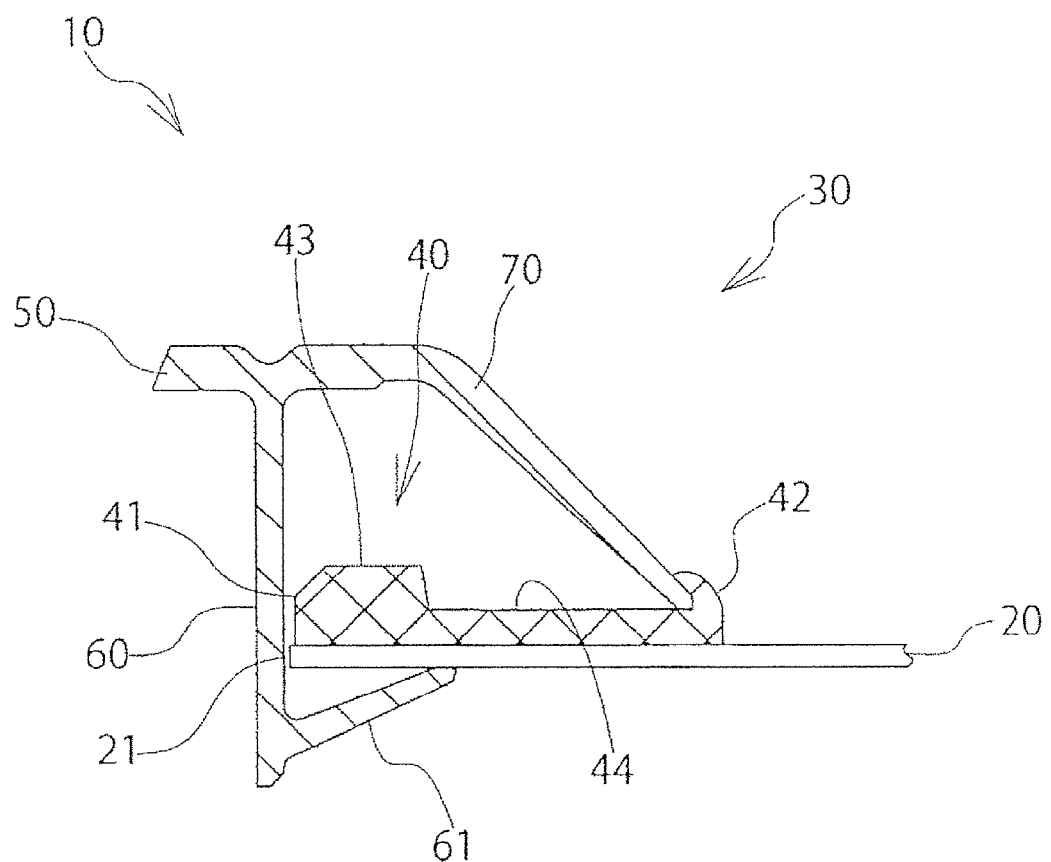
FIG. 10 is a cross-sectional view of one portion of the hole plug in a state of being attached to an opening portion of a panel in the first embodiment of the present invention.
Figure 11:
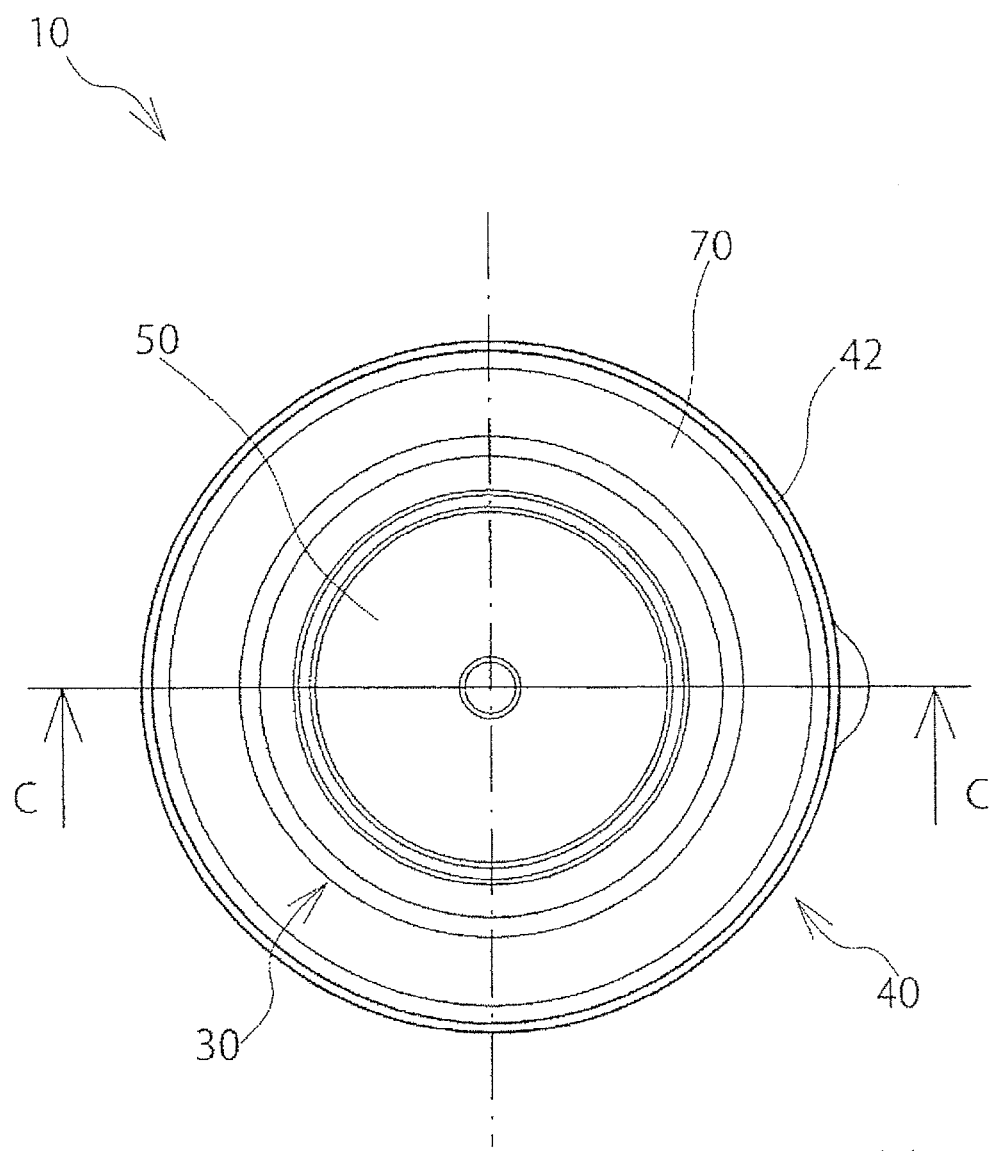
FIG. 11 shows a second embodiment of the present invention, and is a plan view of the hole plug.
Figure 12:
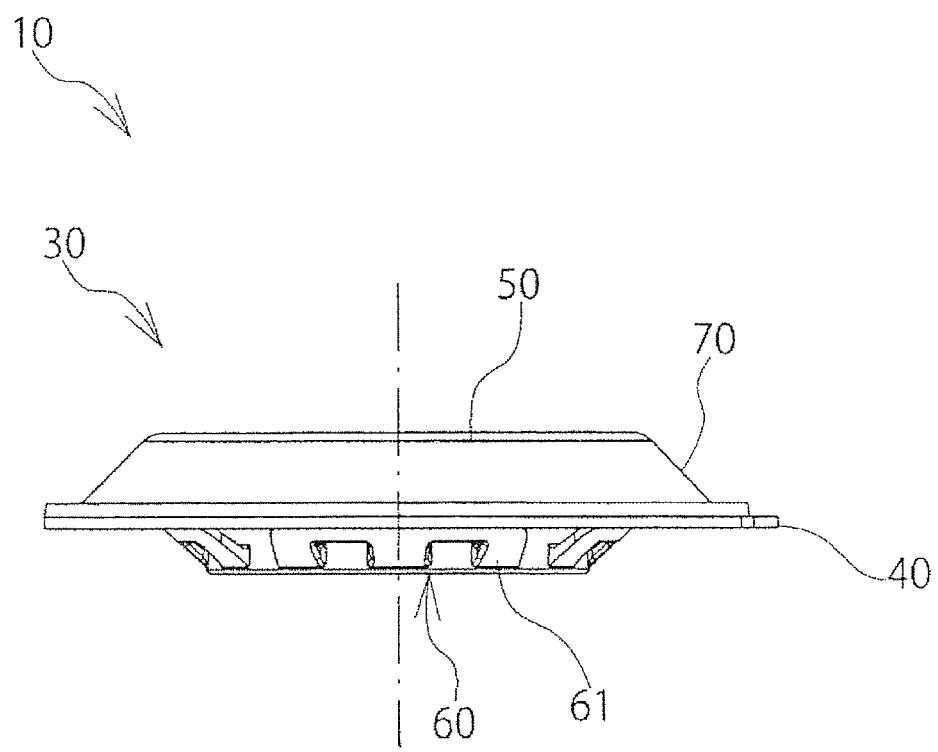
FIG. 12 is a side view of FIG. 11.
Figure 13:
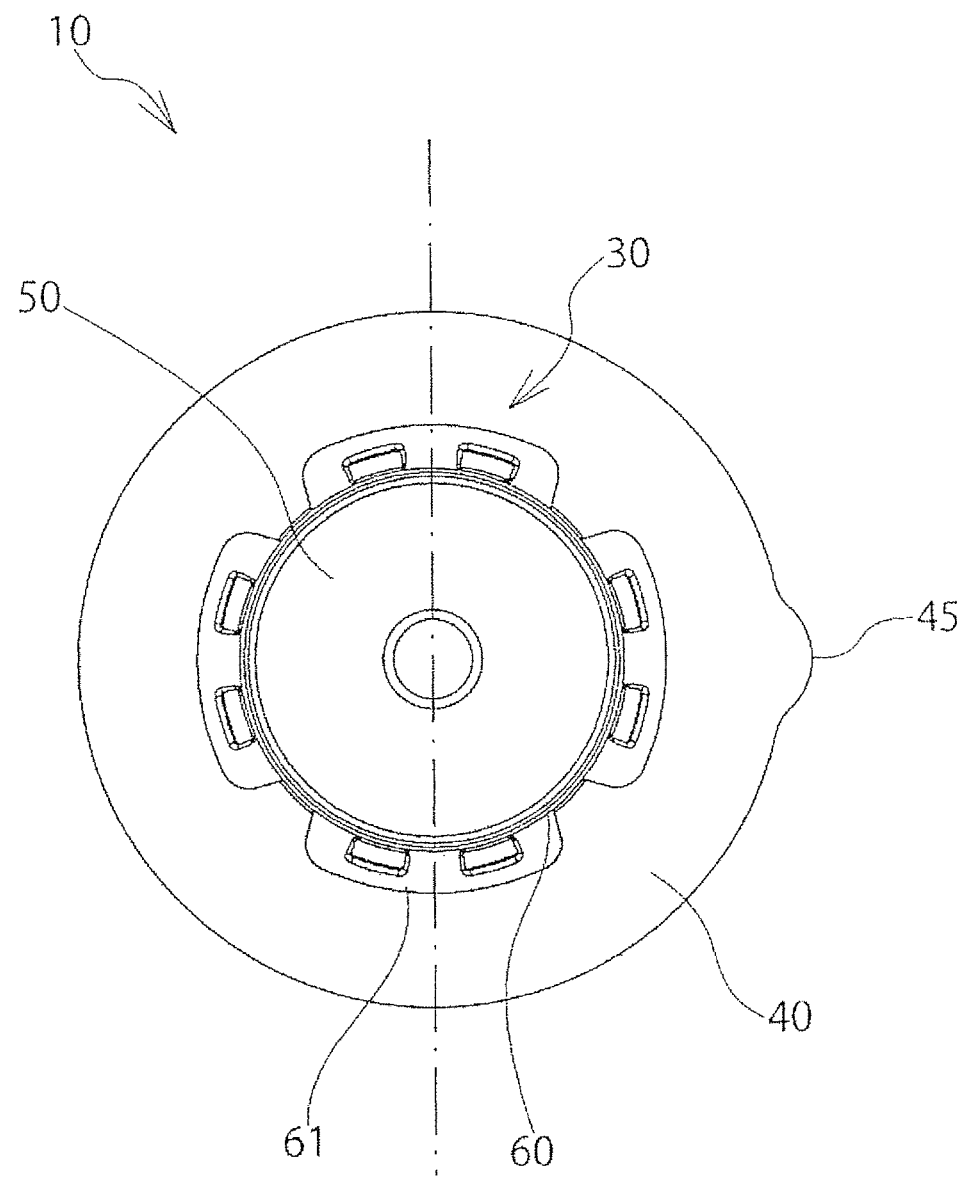
FIG. 13 is a bottom view of FIG. 11.
Figure 14:
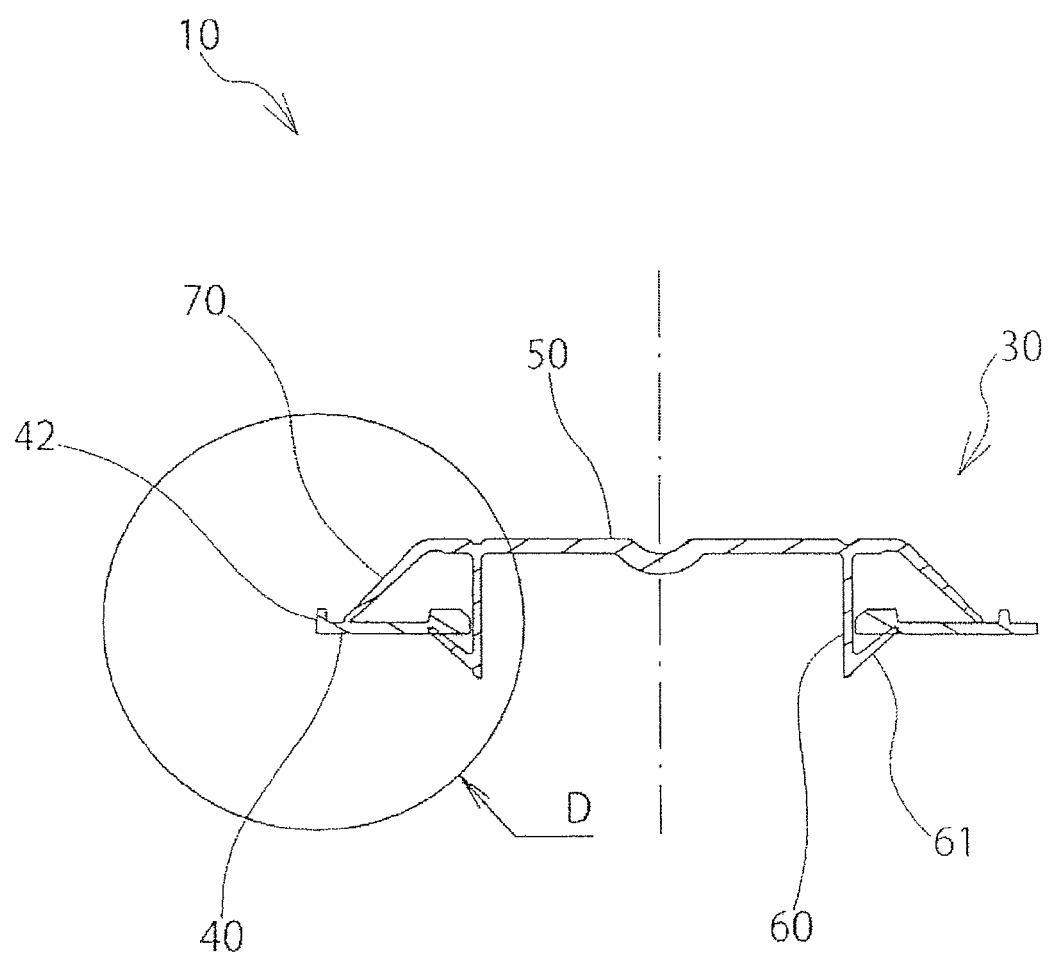
FIG. 14 is a cross-sectional view taken along a line C-C in FIG. 11.

In FIG. 1 and FIG. 2, the numeral reference 10 represents a hole plug, and as shown in FIG. 10, the hole plug 10 is attached to an opening portion 21 provided in a panel 20 to close the opening portion 21.

Although it is not shown in the drawings, the panel 20 is, for example, a body panel for an automobile. The opening portion 21 is formed in the panel 20 by a burring processing, penetrates front and rear faces of the panel 20, and is formed in a circular shape.

As shown in FIGS. 1 to 8, the hole plug 10 broadly comprises the following parts.

Incidentally, the following (1) and (2) will be described later.

(1) Plug main body 30
(2) Meltable member 40

Incidentally, the parts of the hole plug 10 are not limited to the aforementioned (1) and (2).

(Plug Main Body 30)

Figure 9:
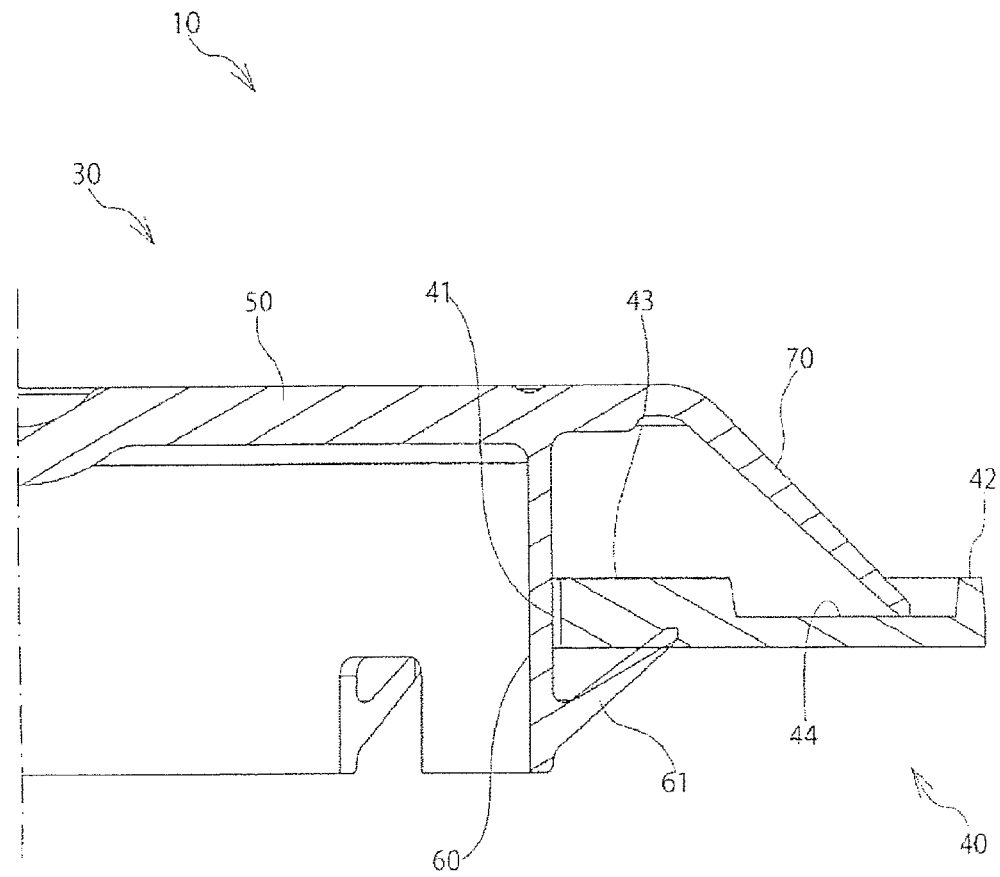
FIG. 9 is an enlarged cross-sectional view of a right half of FIG. 1.

As shown in FIGS. 1, 9, and 10, a plug main body 30 is inserted into the opening portion 21 of the panel 20 to close the opening portion 21.

The plug main body 30 is integrally formed by a thermoplastic resin having adequate rigidity and elasticity, for example, an elastomer (TPE) and the like.

As shown in FIGS. 3 to 6, the plug main body 30 broadly includes the following portions.

Incidentally, the following (1) to (3) will be described later.

(1) Head portion 50
(2) Leg portion 60
(3) Flange portion 70

Incidentally, each portion of the plug main body 30 is not limited to the aforementioned (1) to (3).

(Meltable Member 40)

As shown in FIGS. 1, 9, and 10, a meltable member 40 annularly covers a periphery of the opening portion 21 of the panel 20, is disposed between the later-described flange portion 70 of the plug main body 30 and the panel 20, and melts when heated to seal between the opening portion 21 and the flange portion 70.

The meltable member 40 is formed in a sheet-like doughnut shape having the later-described center hole 41 at a center, and is integrally formed by a thermoplastic resin, for example, an ethylene-vinyl acetate copolymer resin (EVA) and the like.

As shown in FIGS. 1, 2, and 7 to 10, the meltable member 40 broadly includes the following portions.

Incidentally, the following (1) to (5) will be described later.

(1) Center hole 41
(2) Annular convex portion 42
(3) Inner peripheral portion 43
(4) Depression portion 44
(5) Tab portion 45

Incidentally, each portion of the meltable member 40 is not limited to the following (1) to (5).

(Head Portion 50)

As shown in FIG. 10, a head portion 50 has a diameter larger than that of the opening portion 21 provided in the panel 20.

(Leg Portion 60)

As shown in FIG. 10, a leg portion 60 extends from the head portion 50, and reduces a diameter to pass through the opening portion 21 of the panel 20 to sandwich the panel 20 between the leg portion 60 and the head portion 50.

Figure 3:
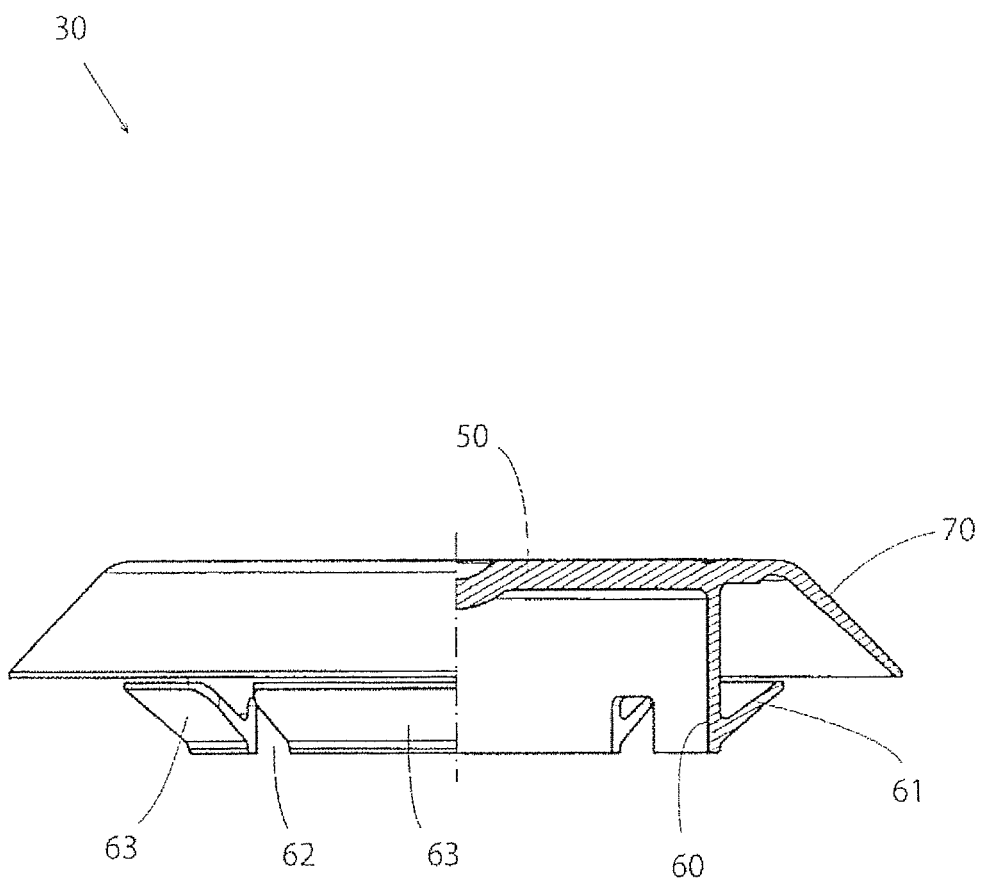
FIG. 3 is a side view of a plug main body wherein one-half thereof is shown as a cross-section in the first embodiment of the present invention.
Figure 4:
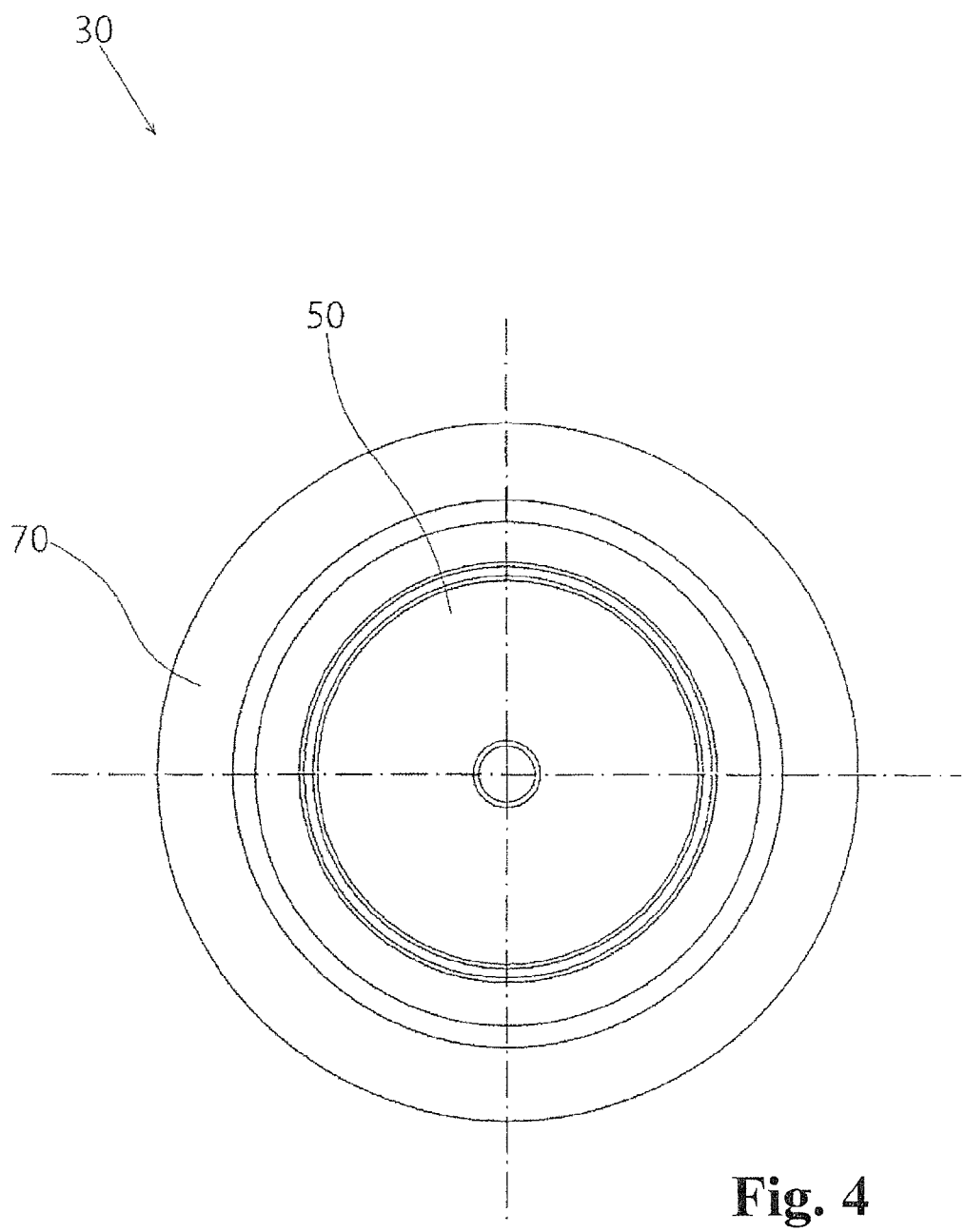
FIG. 4 is a plan view of the plug main body.
Figure 5:
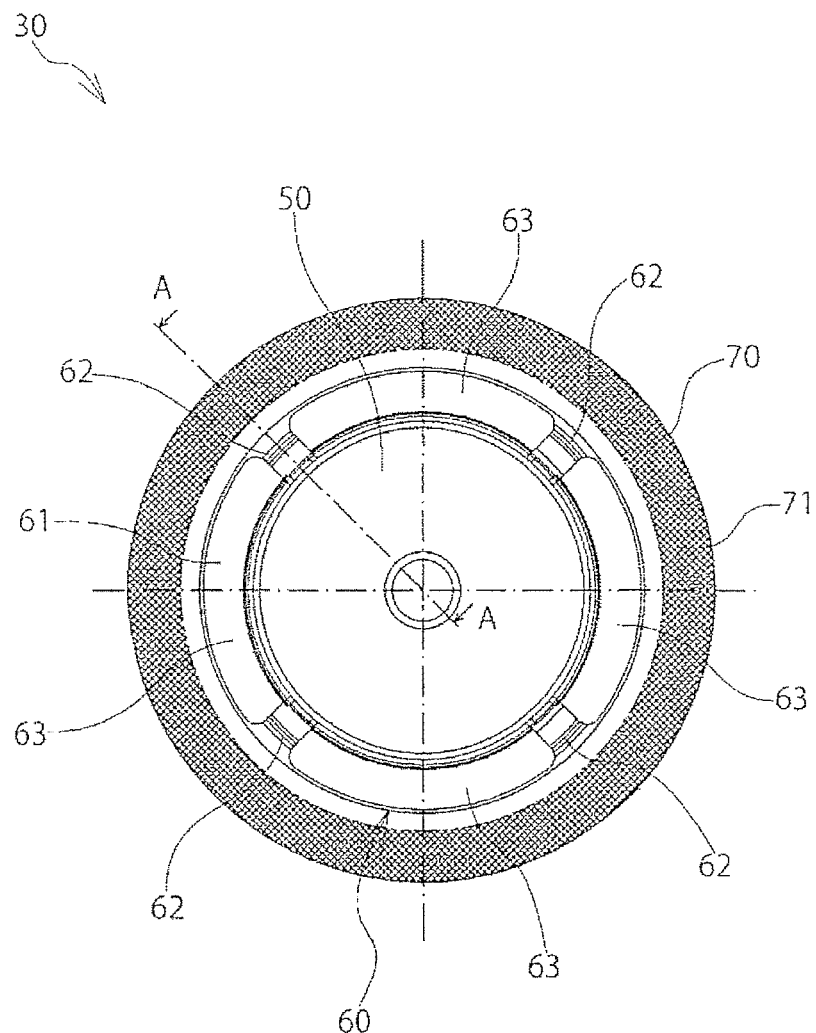
FIG. 5 is a bottom view of the plug main body.
Figure 6:
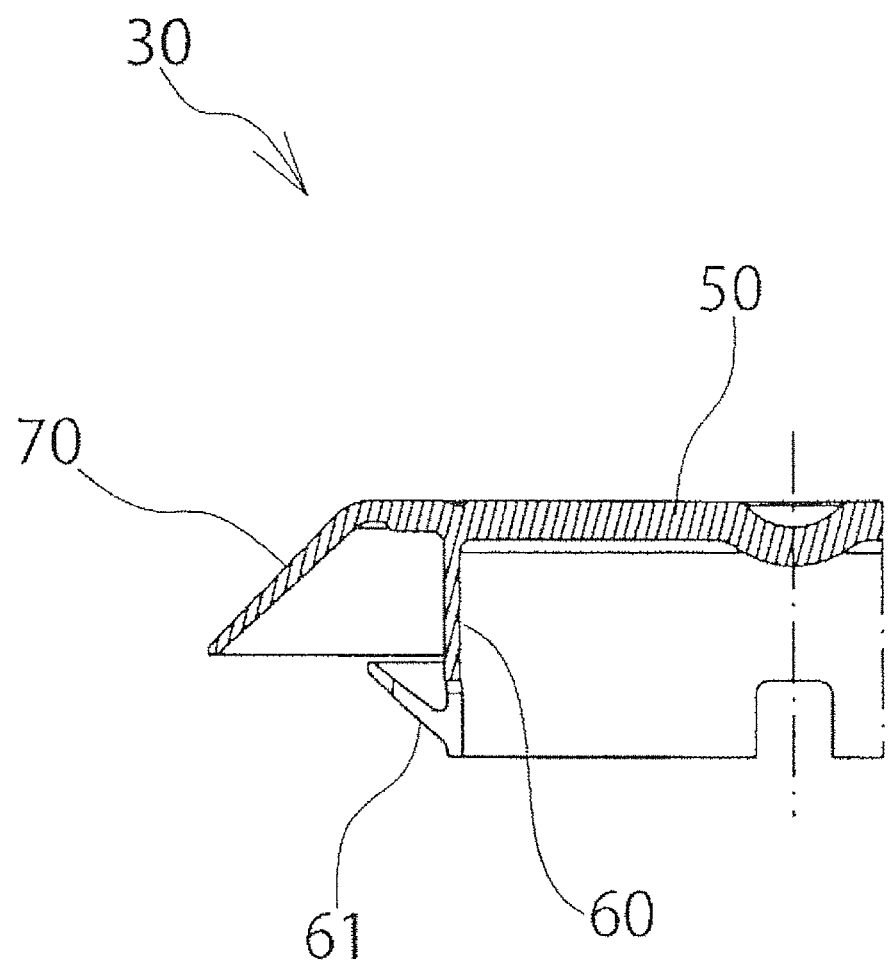
FIG. 6 is a cross-sectional view taken along a line A-A in FIG. 5.

As shown in FIGS. 3, 5, and 6, the leg portion 60 is formed in a cylindrical shape, and an outer diameter thereof is set to be less than or equal to an inner diameter of the opening portion 21 of the panel 20, and in the present embodiment, the outer diameter thereof is set to be approximately equal to the inner diameter of the opening portion 21 of the panel 20.

As shown in FIGS. 3, 5, and 6, the leg portion 60 includes the following portions.

Incidentally, each portion of the leg portion 60 is not limited to the following (1) to (3).

(1) Locking Piece 61

As shown in FIGS. 3, 5, 6, 9, and 10, a locking piece 61 extends toward the head portion 50 in a fold-back shape, is formed in an umbrella shape opening toward the head portion 50, and reduces a diameter to pass through the opening portion 21 of the panel 20 to sandwich the panel 20 between the locking piece 61 and the head portion 50.

The minimum outer diameter of the locking piece 61, i.e., an outer diameter of a lower end portion is set to be less than or equal to the inner diameter of the opening portion 21 of the panel 20, and in the present embodiment, the outer diameter of the lower end portion is set to be approximately equal to the inner diameter of the opening portion 21 of the panel 20. Also, the maximum outer diameter of the locking piece 61, i.e., an outer diameter of an upper end portion is set to be larger than the inner diameter of the opening portion 21 of the panel 20.

(2) Slits 62

As shown in FIGS. 3 and 5, slits 62 cut and divide the locking piece 61 into the later-described plurality of divided pieces 63. Four slits 62 in total are radially formed, and cut and divide the locking piece 61 into four divided pieces 63.

Incidentally, for example, four slits 62 are formed; however, they are not limited to the above, and one, two, three, or five or more slits may be formed.

(3) Divided Pieces 63

As shown in FIGS. 3 and 5, the divided pieces 63 are formed inside an interval of a pair of adjacent slits 62, and are divided into four pieces in total.

Incidentally, the divided pieces 63 are divided into, for example, four pieces; however, they are not limited to the above, and may be formed with one, two, three, or five or more pieces.

(Flange Portion 70)

As shown in FIG. 10, the flange portion 70 extends from the head portion 50 toward the panel 20, and elastically abuts against the panel 20.

The flange portion 70 is an elastic body having a bending property or flexibility, and is distinguished from a conventional rigid body. As shown in FIGS. 1 to 6, and 9, the flange portion 70 is formed in a suction disc form opening toward the panel 20. Namely, the flange portion 70 extends obliquely downward, and gradually reduces a thickness toward a tip portion.

As shown in FIG. 5, the flange portion 70 includes the following portions.

Incidentally, each portion of the flange portion 70 is not limited to the following (1).

(1) Embossment Portion 71

As shown in FIG. 5, an embossment portion 71 is formed at least on an inner peripheral face of the tip portion of the flange portion 70, and the meltable member 40 can be welded thereon.

Incidentally, the embossment portion 71 is formed on the inner peripheral face of the tip portion of the flange portion 70; however, it is not limited to the above, and may be formed on an outer peripheral face of the tip portion of the flange portion 70, or be formed on both faces of the inner peripheral face and the outer peripheral face.

Figure 15:
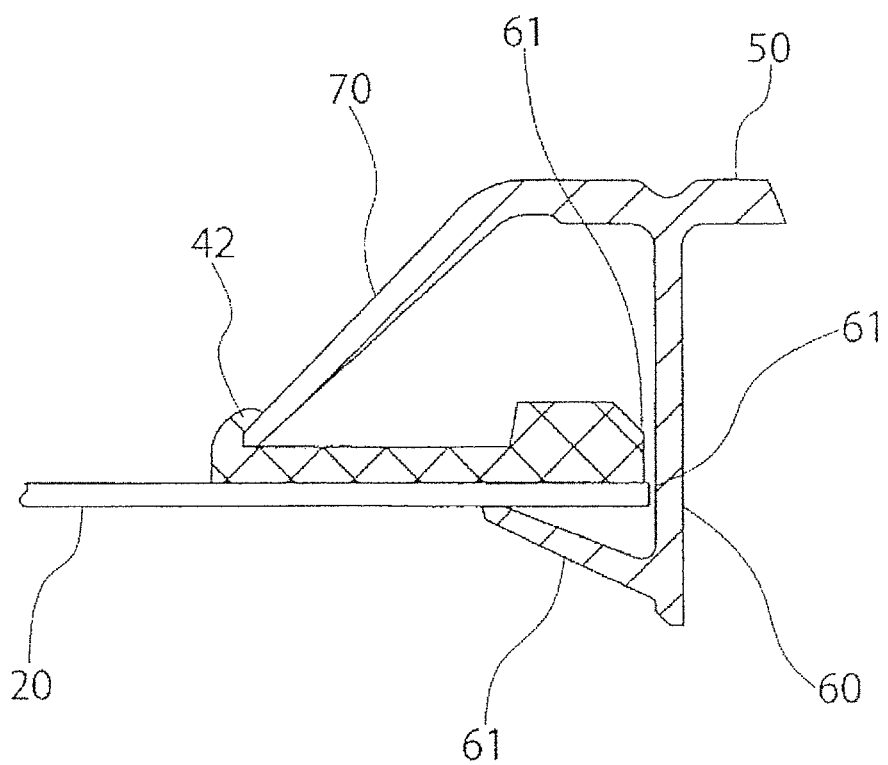
FIG. 15 is an enlarged cross-sectional view of a D portion in FIG. 14.
Figure 16:
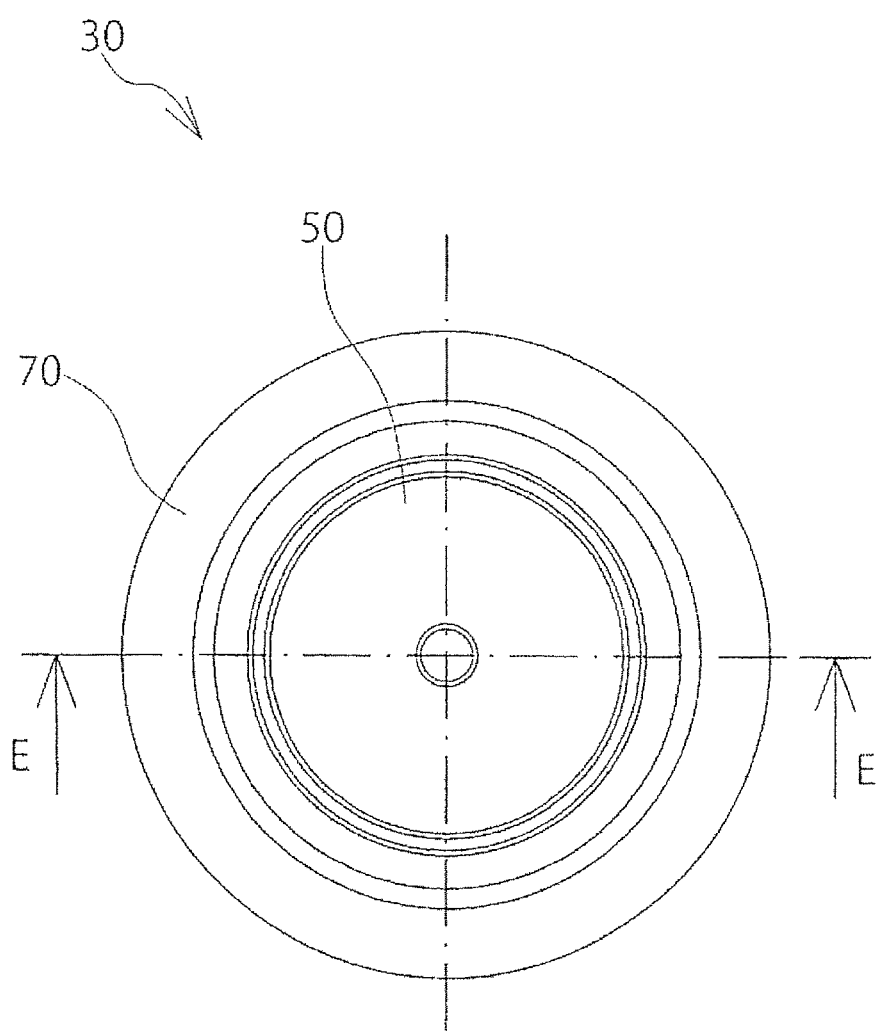
FIG. 16 is a plan view of the plug main body in FIG. 11.

Also, a welding strength of the meltable member 40 varies according to a thickness of the panel 20 (see FIG. 15). Namely, in a case wherein the panel 20 is thick, the flange portion 70 bends more largely when attached to the panel 20, and a weld quantity of the meltable member 40 into the embossment portion 71 increases so as to improve the weld strength.

(Center Hole 41)

As shown in FIGS. 7 to 10, the center hole 41 is positioned at the center of the meltable member 40, and is formed in a circular shape penetrating in a thickness direction. An inner diameter thereof is set to be less than or equal to the outer diameter of the leg portion 60.

As shown in FIGS. 1 and 9, the meltable member 40 is fitted into an outer periphery of the leg portion 60 to be mounted by fitting the center hole 41 into the leg portion 60 and using elasticity of the meltable member 40 and bending of the locking piece 61 of the leg portion 60.

(Annular Convex Portion 42)

As shown in FIG. 10, an annular convex portion 42 is positioned around the meltable member 40, annularly projects in the thickness direction of the meltable member 40, and abuts against the tip portion of the flange portion 70 when the meltable member 40 thermally shrinks in such a way as to reduce a diameter toward a center of the opening portion 21.

As shown in FIGS. 1, 9, and 10, the annular convex portion 42 projects higher than the tip portion of the flange portion 70, and at a time of thermal shrinkage, the annular convex portion 42 is welded to the tip portion of the flange portion 70 in such a way as to wrap the tip portion of the flange portion 70 inward in a radial direction from an outer peripheral direction of the flange portion 70.

Also, as shown in FIGS. 1 and 9, the annular convex portion 42 is positioned away from the tip portion of the flange portion 70. As shown in FIG. 10, the annular convex portion 42 abuts against the tip portion of the flange portion 70 when the meltable member 40 thermally shrinks.

(Inner Peripheral Portion 43)

As shown in FIGS. 7 to 10, an inner peripheral portion 43 is positioned around the center hole 41, and is annularly formed thickly. A height of the inner peripheral portion 43 is set to be equal to a height of the annular convex portion 42. Conversely, the height of the annular convex portion 42 is set to be equal to the height or a thickness of the inner peripheral portion 43.

Incidentally, the height of the inner peripheral portion is set to be equal to the height of the annular convex portion 42; however, the height of the inner peripheral portion 43 is not limited to the above, and may be different from the height of the annular convex portion 42.

(Depression Portion 44)

As shown in FIGS. 7 to 10, a depression portion 44 is positioned between the annular convex portion 42 and the inner peripheral portion 43, is formed to be lower by one step than the annular convex portion 42 and the inner peripheral portion 43, and is annularly formed thinly.

As shown in FIGS. 1 and 9, the tip portion of the flange portion 70 abuts against a bottom of the depression portion 44. As shown in FIG. 10, while maintaining a state of abutting against the bottom of the depression portion 44, the tip portion of the flange portion 70 abuts against an inside face of the annular convex portion 42 when the meltable member 40 thermally shrinks.

Also, there is positively formed a gap between the tip portion of the flange portion 70 and the annular convex portion 42, so that when inserted into the panel 20 (see FIG. 15), the flange portion 70 is allowed to bend, or a bending quantity can be set largely.

(Tab Portion 45)

Figure 7:
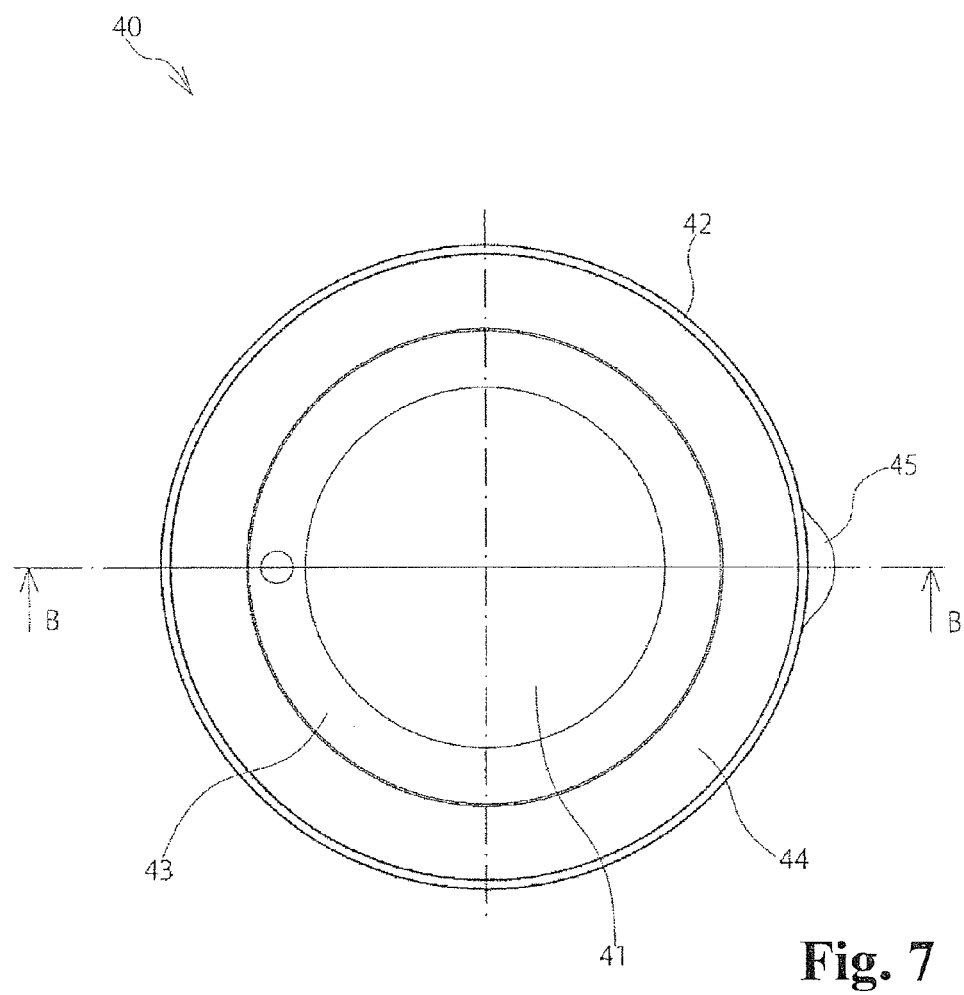
FIG. 7 is a plan view of a meltable member in the first embodiment of the present invention.
Figure 8:
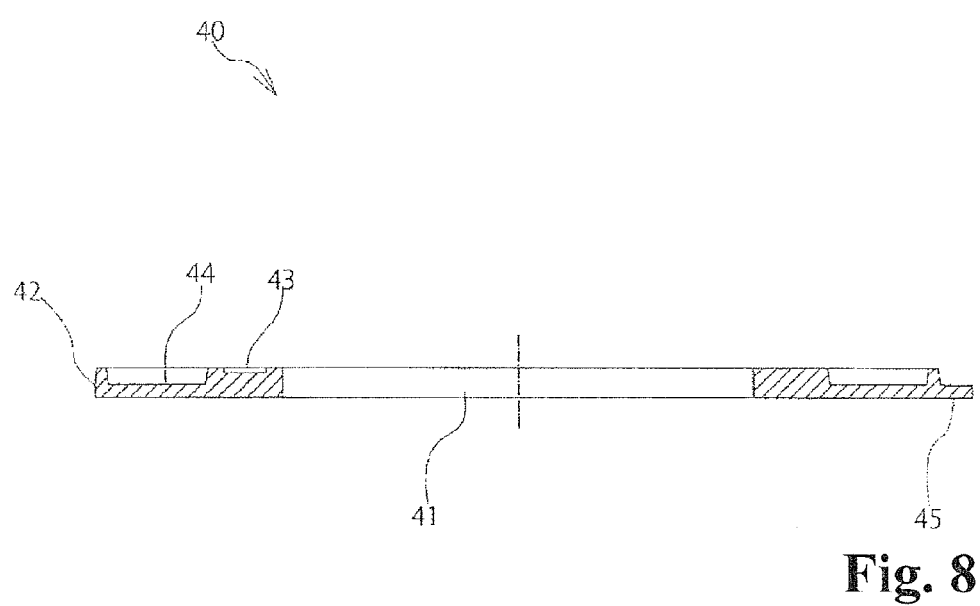
FIG. 8 is a cross-sectional view taken along a line B-B in FIG. 7.

As shown in FIGS. 7 and 8, a tab portion 45 projects outward in a radial direction from an outer periphery of the meltable member 40 approximately in a mountain shape or a semicircular shape. The tab portion 45 predicts a so-called sink of a resin due to a thermal shrinkage at a time of forming, and enlarges a shape.

(Mounting Method of the Hole Plug 10)

Next, a method of closing the opening portion 21 of the panel 20 will be explained using the hole plug 10 having the aforementioned structure.

As shown in FIG. 10, in a state wherein the meltable member 40 is fitted into the leg portion 60 of the plug main body 30 to be mounted, the leg portion 60 is fitted and inserted into the opening portion 21 of the panel 20.

When the leg portion 60 is inserted, the locking piece 61 thereof is pressed by an inner edge portion of the opening portion 21, and bends to reduce a diameter. After that, as shown in FIG. 10, when the locking piece 61 passes through the opening portion 21, the locking piece 61 elastically restores to its original state, sandwiches the meltable member 40, and sandwiches the panel 20 between the locking piece 61 and the head portion 50 so as to be locked in the opening portion 21.

Next, when a vicinity of the opening portion 21 is heated as a whole, the meltable member 40 mounted on the leg portion 60 thermally shrinks in such a way as to reduce a diameter toward the center of the opening portion 21, and as shown in FIG. 10, the inside face of the annular convex portion 42 thereof abuts against the tip portion of the flange portion 70.

Thereby, the thermal shrinkage of the meltable member 40 is controlled so-called automatically.

Also, as shown in FIG. 10, the annular convex portion 42 melts, and is welded to an end face and the outer peripheral face of the tip portion of the flange portion 70 in such a way as to wrap the tip portion of the flange portion 70 inward in the radial direction from the outer peripheral direction of the flange portion 70.

Moreover, although it is not shown in the drawings, the annular convex portion 42 and the depression portion 44 melt, and are welded to the inner peripheral face of the tip portion of the flange portion 70 including the embossment portion 71.

Second Embodiment in FIGS. 11 to 23

Next, with reference to FIGS. 11 to 23, a second embodiment of the present invention will be explained.

Figure 17:
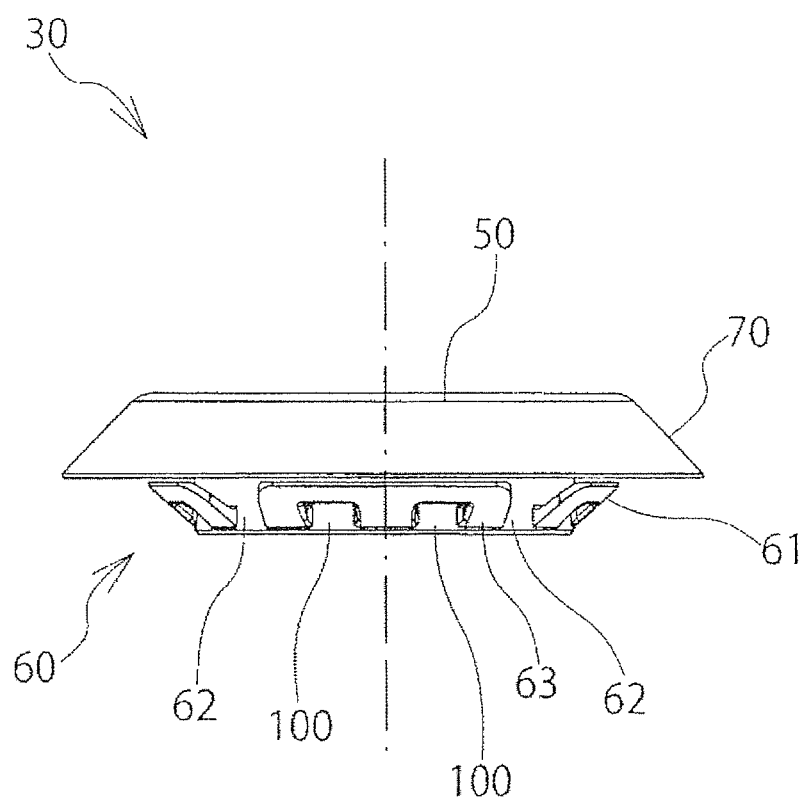
FIG. 17 is a side view of FIG. 16.
Figure 18:
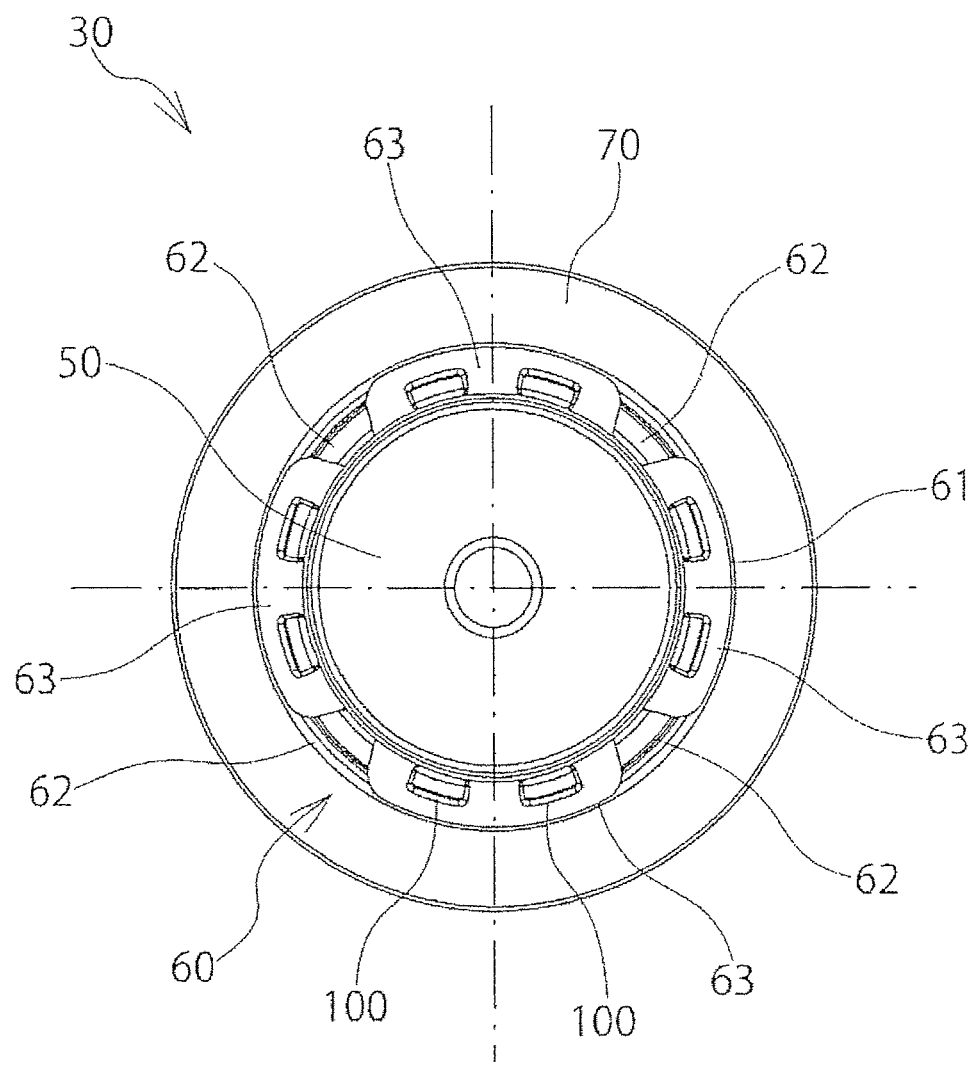
FIG. 18 is a bottom view of FIG. 16.
Figure 19:
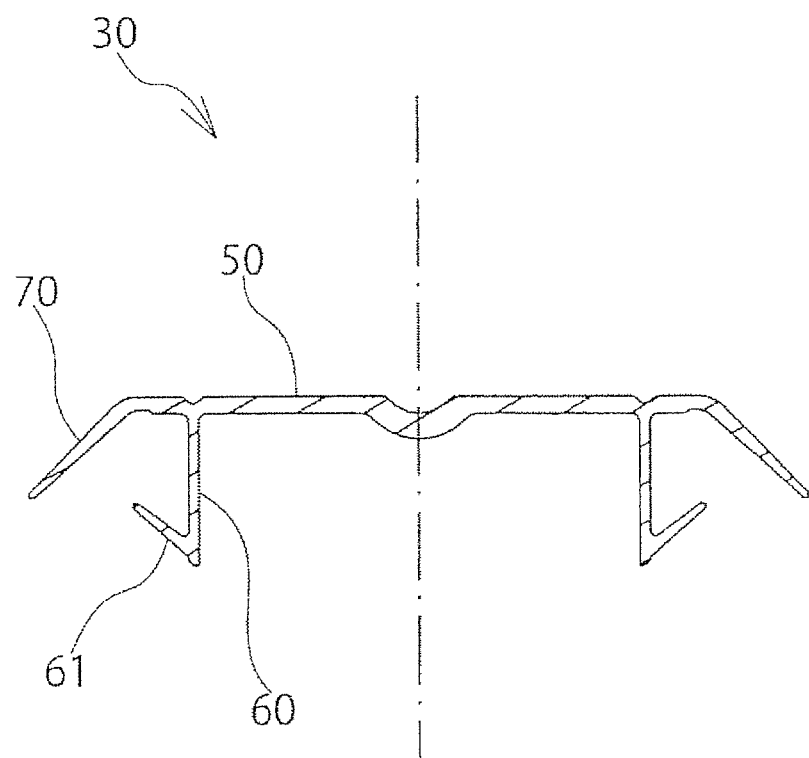
FIG. 19 is a cross-sectional view taken along a line E-E in FIG. 16.
Figure 20:
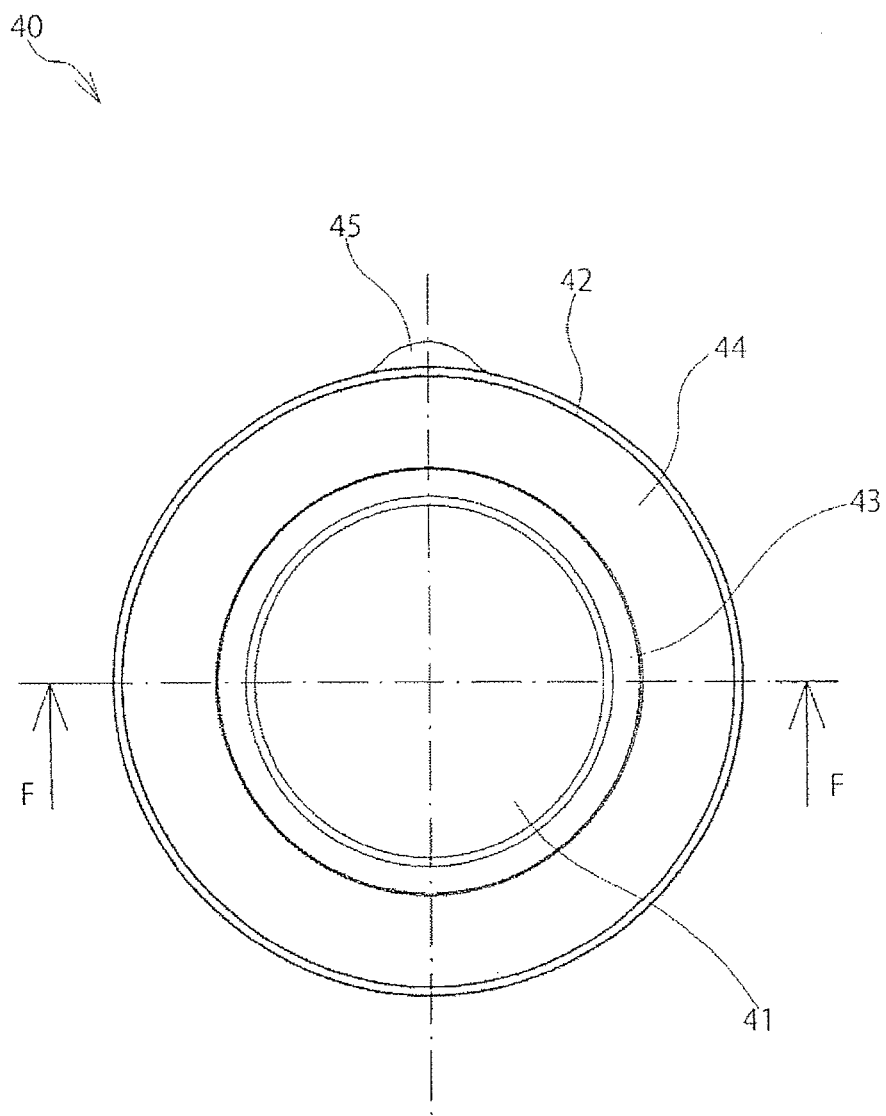
FIG. 20 is a plan view of the meltable member in FIG. 11.
Figure 21:
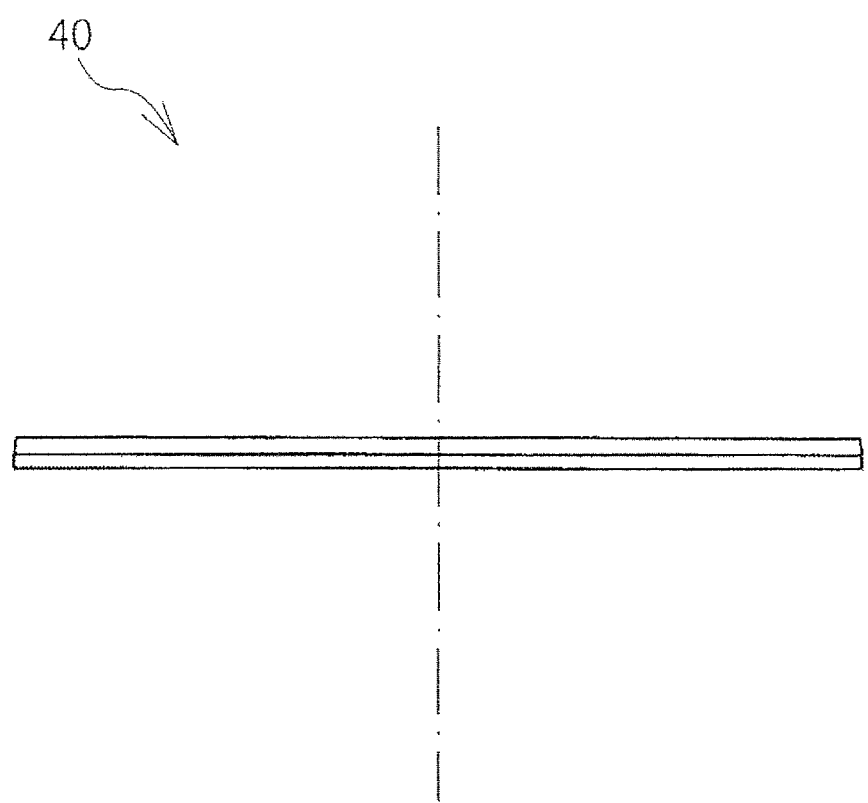
FIG. 21 is a side view of FIG. 20.
Figure 22:
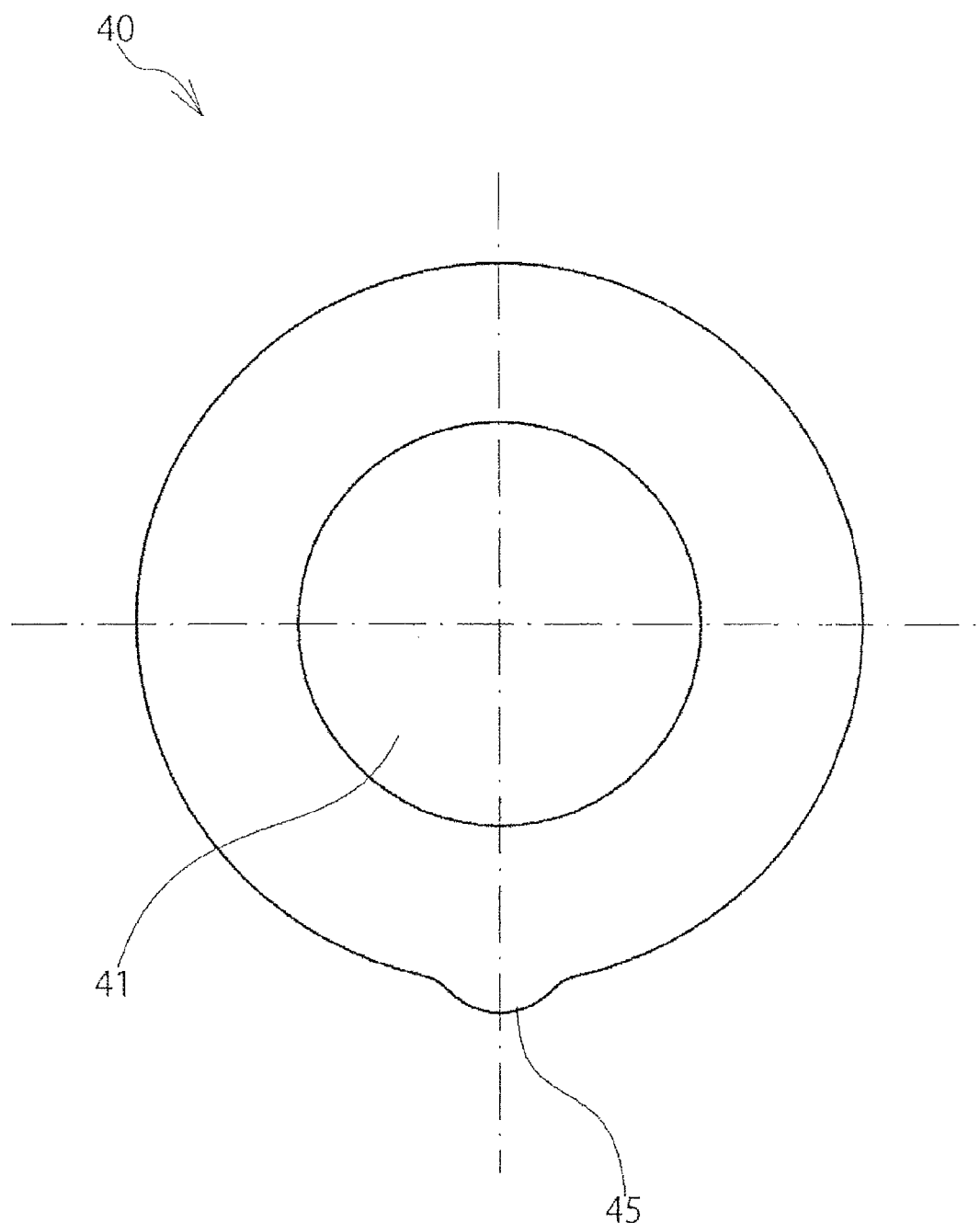
FIG. 22 is a plan view of FIG. 20.
Figure 23:
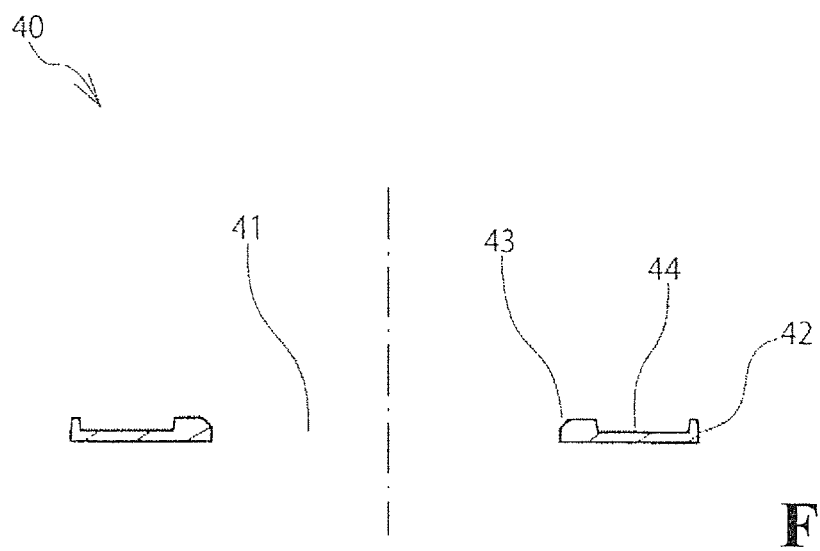
FIG. 23 is a cross-sectional view taken along a line F-F in FIG. 20.

A characteristic of the present embodiment is that first, as shown in FIGS. 17 and 18, in each divided piece 63 of the leg portion 60, there is formed a notch portion 100 penetrating inside and outside.

Secondly, a characteristic of the present embodiment is that as shown in FIGS. 17 and 18, a plurality of notch portions 100 is provided in each divided piece 63.

Namely, as shown in FIGS. 17 and 18, the notch portion 100 penetrates inner and outer peripheries in a thickness direction of each divided piece 63, and is formed in a square shape. Also, the plurality of notch portions 100 is provided in each divided piece 63, for example, two notch portions 100 are provided adjacently in a circumferential direction.

Incidentally, the notch portion 100 is formed in, for example, the square shape; however, it is not limited to the above. Also, for example, two notch portions 100 are provided; however, they are not limited to the above, and one, or three or more notch portions 100 may be provided. Moreover, the two notch portions 100 are provided adjacently in the circumferential direction; however, they are not limited to the above.

Incidentally, in an explanation of the present embodiment, regarding the same structure as the first embodiment previously explained with FIGS. 1 to 10, the explanation is omitted using the same reference numbers and alphabets.

According to the present embodiment, the notch portion 100 is formed so as to reduce an insertion force of the leg portion 60 relative to the opening portion 21 of the panel 20.

Moreover, the plurality of notch portions 100 is provided so as to reduce the insertion force of the leg portion 60 furthermore.

Figure 24:
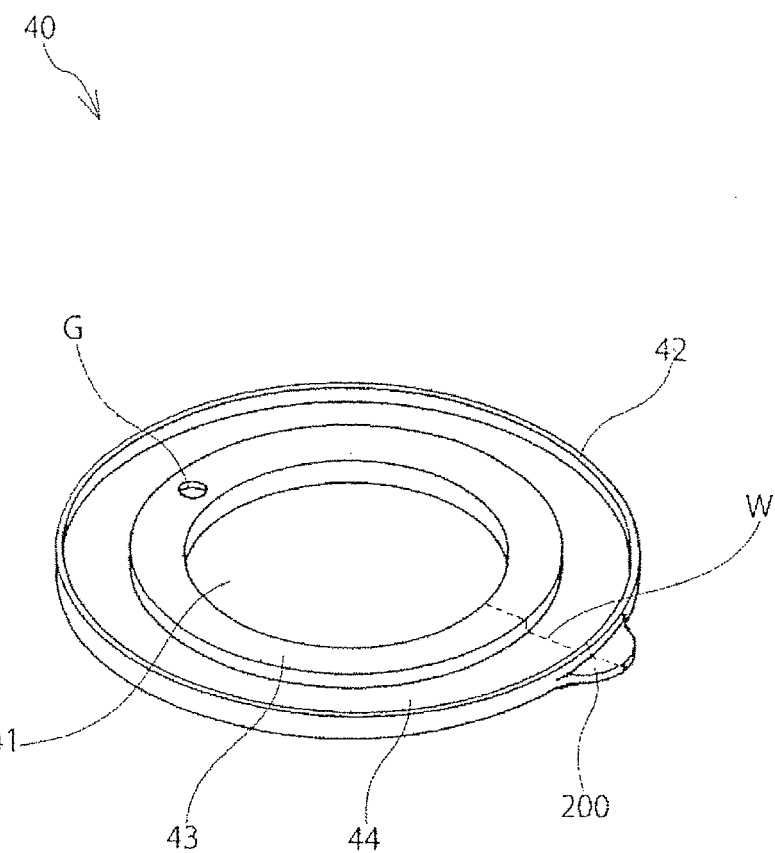
FIG. 24 shows a third embodiment of the present invention, and is a perspective view of the meltable member.
Figure 25:
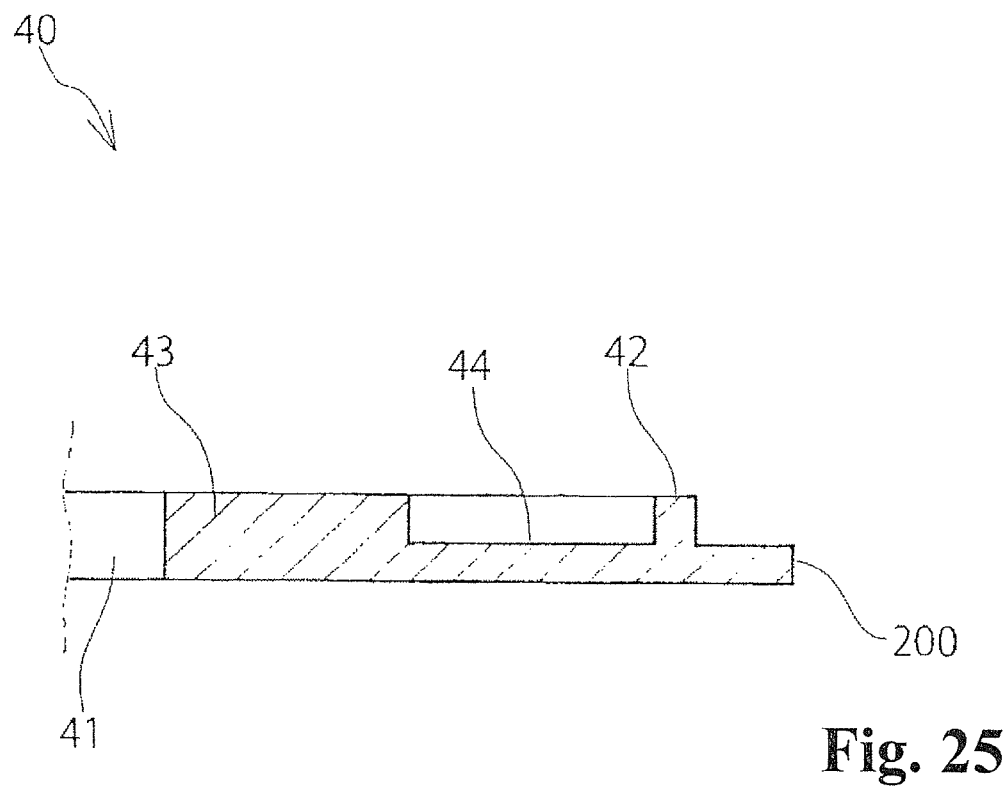
FIG. 25 shows a cross-sectional face of one portion approximately taken along a weld line in FIG. 24.

Third Embodiment in FIGS. 24 and 25

With reference to FIGS. 24 and 25, a third embodiment of the present invention will be explained.

The present embodiment relates to an improvement of the meltable member 40.

Namely, a characteristic of the present embodiment is that as shown in FIGS. 24 and 25, a second tab portion 200 is formed in the meltable member 40, which is positioned on an extension line of a weld line W, and projects outward in the radial direction from the outer periphery of the meltable member 40.

According to the present embodiment, the second tab portion 200 is formed on the extension line of the weld line W so as to improve strength at a portion where the weld line W is located.

Specifically, as shown in FIGS. 24 and 25, the second tab portion 200 is positioned on the extension line of the weld line W, and projects outward in the radial direction from the outer periphery of the meltable member 40 in a tongue piece shape.

A flat surface of the second tab portion 200 is formed approximately in a semicircular shape around the weld line W, and a thickness thereof approximately conforms to a thickness of the depression portion 44. The second tab portion 200 is positioned on an outer peripheral side of the annular convex portion 42, and is formed to be lower by one step than an upper face of the annular convex portion 42.

Although it is not shown in the drawings, a thin line generated at a portion where flow of a molten resin is joined and fused inside a die in resin molding is called the weld line W. Also, in the drawings, the reference alphabet G shows a gate position.

The weld line W is a line of an assumed and predicted molded article of the meltable member 40. Incidentally, it is possible to actually produce a die (not shown in the drawings) for molding the meltable member 40, to actually mold the meltable member 40 using the produced die, to check a state of the weld line W of the molded article, and then, to decide a position of the second tab portion 200; however, it is not practical in terms of a cost and a time.

Incidentally, in the explanation of the present embodiment, regarding the same structure as the first embodiment previously explained with FIGS. 1 to 10, the explanation is omitted using the same reference numbers and alphabets.

Fourth Embodiment in FIGS. 26 to 29

With reference to FIGS. 26 to 29, a fourth embodiment of the present invention will be explained.

The present embodiment relates to an improvement of the meltable member 40.

Figure 26:
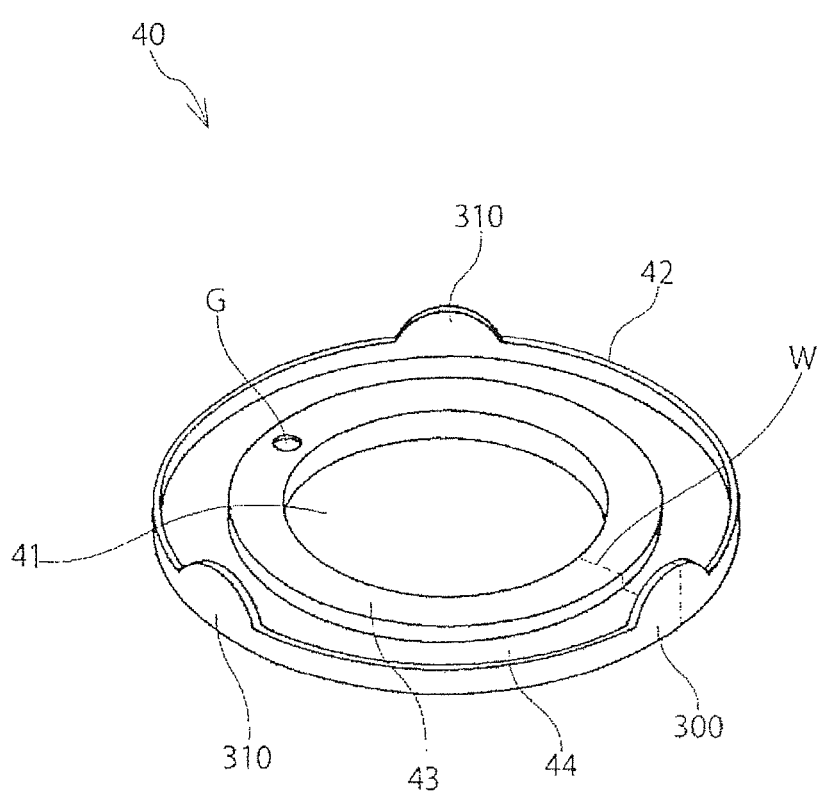
FIG. 26 shows a fourth embodiment of the present invention, and is a perspective view of the meltable member.
Figure 27:
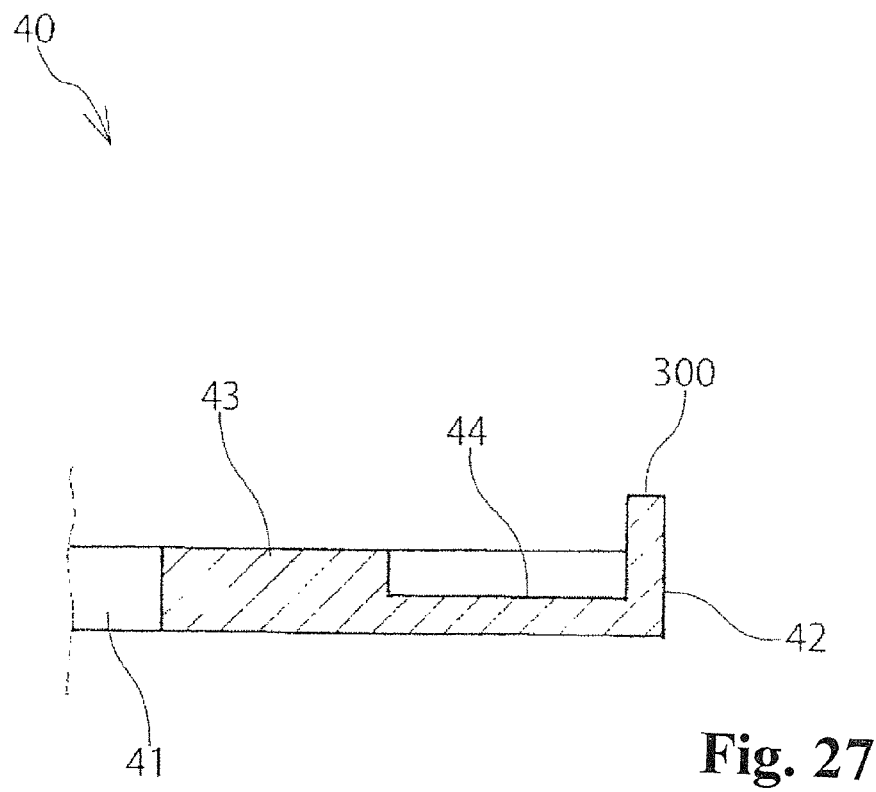
FIG. 27 shows a cross-sectional face of one portion approximately taken along a weld line in FIG. 26.

Namely, a characteristic of the present embodiment is that as shown in FIGS. 26 and 27, a third tab portion 300 is formed, which is positioned on the extension line of the weld line W, projects from the annular convex portion 42, and extends in a projection direction of the annular convex portion 42.

Figure 28:
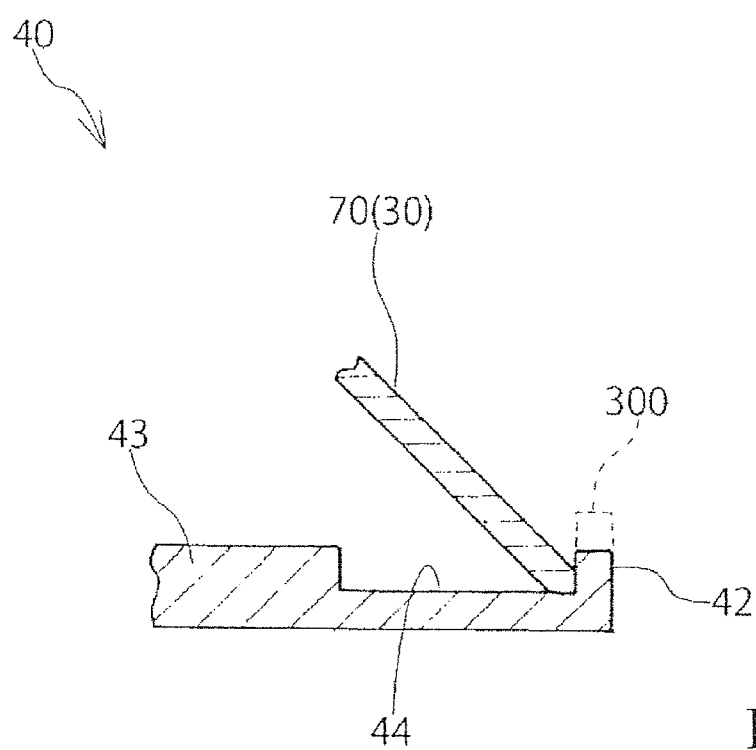
FIG. 28 is a cross-sectional view of one portion for explaining an engagement state between a flange portion of the plug main body and the meltable member.
Figure 29:
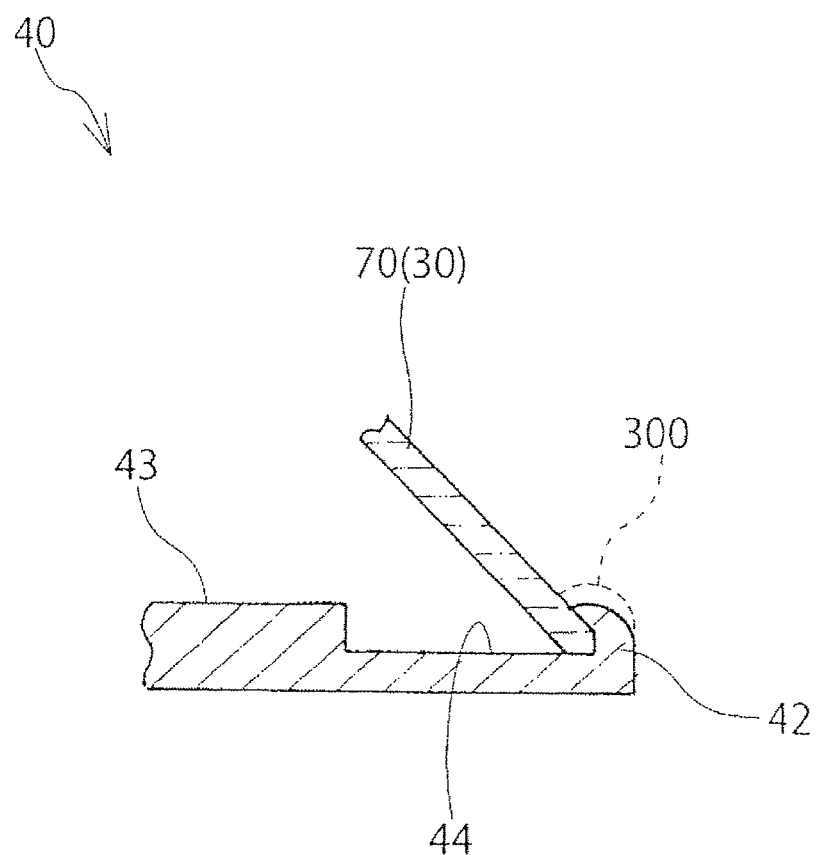
FIG. 29 corresponds to FIG. 28, and is a cross-sectional view of one portion for explaining a molten state of the meltable member.

According to the present embodiment, there is formed the third tab portion 300 positioned on the extension line of the weld line W, and projecting from the annular convex portion 42 so as to not only improve the strength at the portion where the weld line W is located, but also, as shown in FIGS. 28 and 29, the third tab portion 300 is welded to the flange portion 70 of the plug main body 30 so as to improve a bonding strength between the flange portion 70 and the meltable member 40.

Specifically, as shown in FIGS. 26 and 27, the third tab portion 300 is positioned on the extension line of the weld line W, and projects upward from an upper edge portion of the annular convex portion 42 in a tongue piece shape. A side face of the third tab portion 300 is formed approximately in a semicircular shape around the weld line W, and a thickness thereof approximately conforms to a thickness of the annular convex portion 42.

Also, as shown in FIG. 26, in the meltable member 40, in addition to the third tab portion 300, there is formed a plurality of auxiliary tab portions 310 at positions away from the third tab portion 300. Two auxiliary tab portions 310 are formed away from the third tab portion 300 at an interval of 120 degrees, respectively. A side face of the auxiliary tab portion 310 is formed approximately in a semicircular shape as with the third tab portion 300, and a thickness thereof approximately conforms to the thickness of the annular convex portion 42.

As a result, there are formed three tab portions in total by adding two auxiliary tab portions 310 to one third tab portion 300.

Incidentally, two auxiliary tab portions 310 are formed; however, they are not limited to the above, and all of the two auxiliary tab portions 310 may be omitted, or one or three or more auxiliary tab portions 310 may be formed.

Also, in the explanation of the present embodiment, regarding the same structure as the first embodiment previously explained with FIGS. 1 to 10, and as the third embodiment previously explained with FIGS. 24 and 25, the explanation is omitted using the same reference numbers and alphabets.

Next, an operation of the third tab portion 300 will be explained.

When the meltable member 40 is heated, the annular convex portion 42 melts, and as shown in FIGS. 28 and 29 with the solid lines, the molten annular convex portion 42 is welded to the end face and the outer peripheral face of the tip portion of the flange portion 70 in such a way as to wrap the tip portion of the flange portion 70 inward in the radial direction from the outer peripheral direction of the flange portion 70 of the plug main body 30.

Simultaneously, as shown in FIGS. 28 and 29 with the dotted lines, the third tab portion 300 melts as well, and the molten third tab portion 300 is welded to the end face and the outer peripheral face of the tip portion of the flange portion in such a way as to wrap the tip portion of the flange portion 70 inward in the radial direction from the outer peripheral direction of the flange portion 70.

Incidentally, the auxiliary tab portions 310 melt as well, so that in a case wherein the flange portion 70 is positioned on an inner peripheral side thereof, the molten auxiliary tab portions 310 are welded to the flange portion 70.

Consequently, compared to a case of a single annular convex portion 42, the third tab portion 300 is welded to the flange portion 70 so as to improve the bonding strength between the flange portion 70 and the meltable member 40.

Also, the auxiliary tab portions 310 melt as well so as to improve the bonding strength between the flange portion 70 and the meltable member 40.

Figure 30:
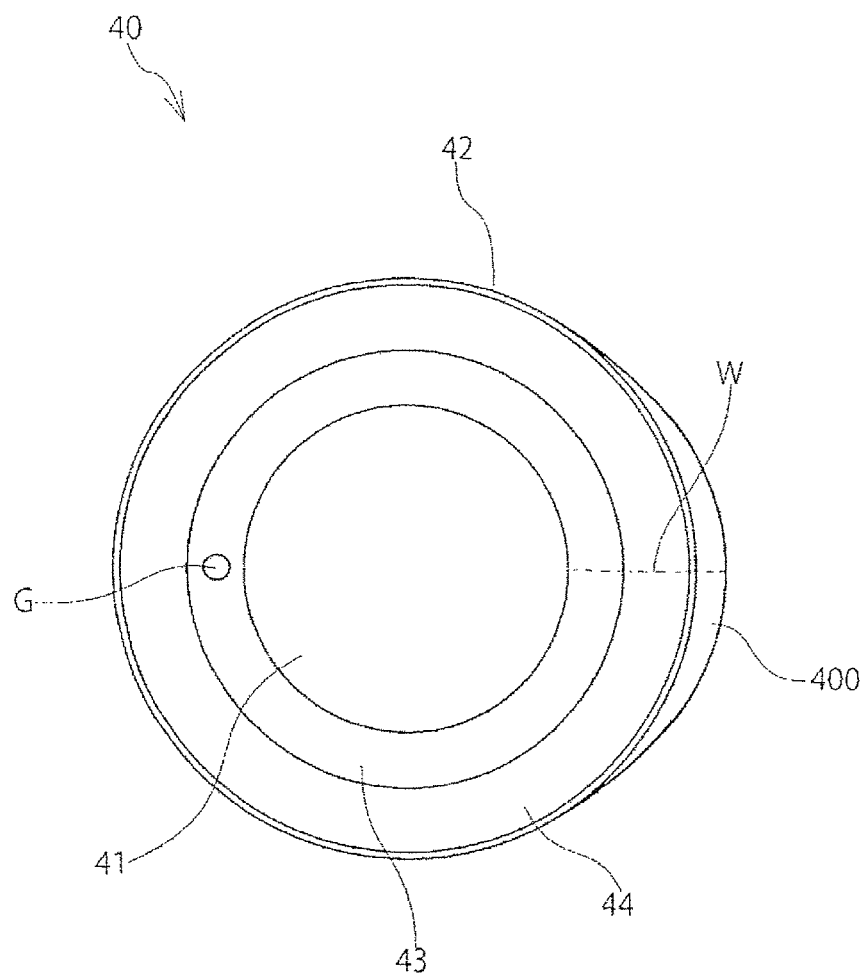
FIG. 30 shows a fifth embodiment of the present invention, and is a plan view of the meltable member.
Figure 31:
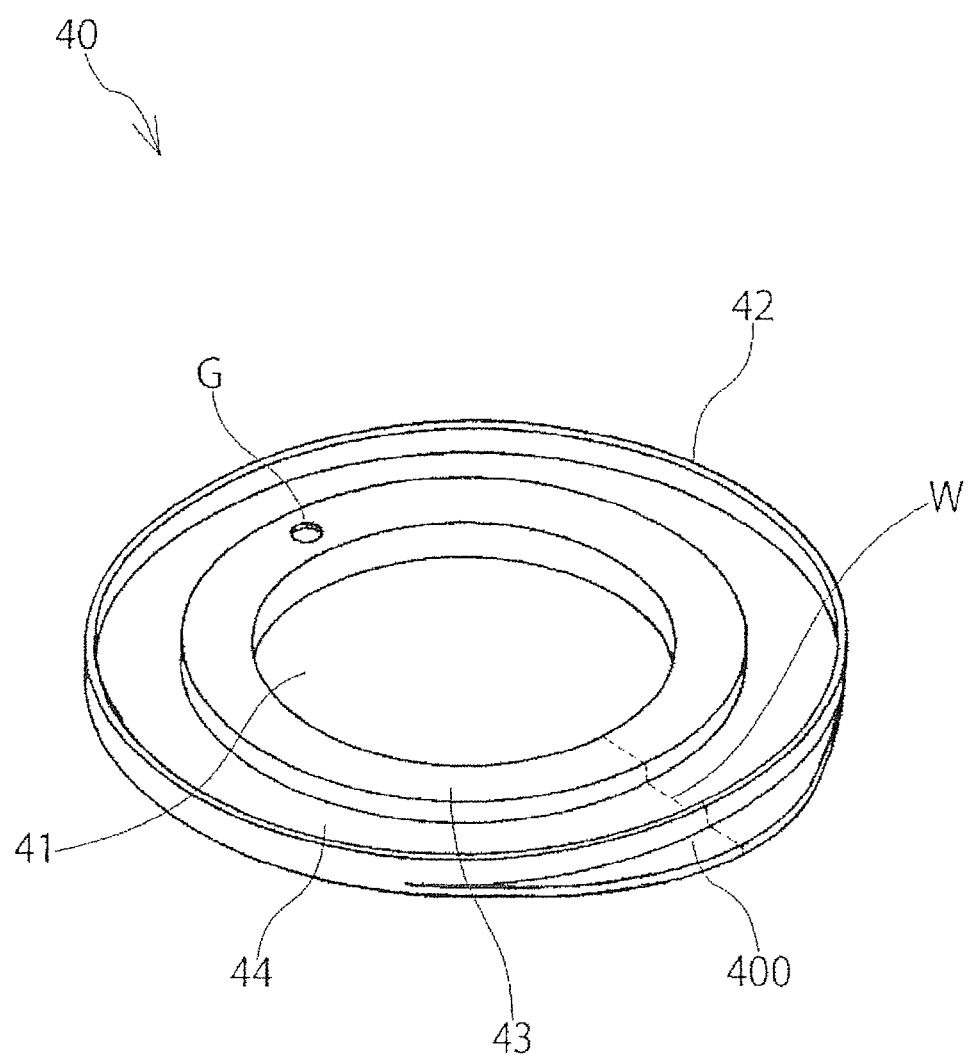
FIG. 31 is a perspective view of FIG. 30.

Fifth Embodiment in FIGS. 30 and 31

With FIGS. 30 and 31, a fifth embodiment of the present invention will be explained.

The present embodiment relates to an improvement of the meltable member 40.

Namely, first, a characteristic of the present embodiment is that as shown in FIGS. 30 and 31, a fourth tab portion 400 is formed in the meltable member 40, which is positioned on the extension line of the weld line W, and projects outward in the radial direction from the outer periphery of the meltable member 40.

Secondly, a characteristic of the present embodiment is that as shown in FIGS. 30 and 31, an outer periphery of the fourth tab portion 400 is positioned along a tangent of the outer periphery of the meltable member 40.

Thirdly, a characteristic of the present embodiment is that as shown in FIG. 31, a thickness of the fourth tab portion 400 conforms to the thickness of the meltable member 40 except for that of the annular convex portion 42.

Fourthly, a characteristic of the present embodiment is that as shown in FIG. 31, an upper face of the fourth tab portion 400 is formed to be lower by one step than the upper face of the annular convex portion 42.

According to the present embodiment, the outer periphery of the fourth tab portion 400 is positioned along the tangent of the outer periphery of the meltable member 40 so as to improve the strength at the portion where the weld line W is located.

Especially, according to the present embodiment, the outer periphery of the fourth tab portion 400 is positioned along the tangent of the outer periphery of the meltable member 40 so as to enlarge an area on a flat surface of the fourth tab portion 400.

Specifically, as shown in FIGS. 30 and 31, the fourth tab portion 400 is positioned on the extension line of the weld line W, and projects outward in the radial direction from the outer periphery of the meltable member 40 in a tongue piece shape. A flat surface of the fourth tab portion 400 is formed approximately in a crescent shape around the weld line W, and the outer periphery thereof is formed along the tangent of the outer periphery of the meltable member 40. The thickness of the fourth tab portion 400 approximately conforms to the thickness of the depression portion 44, and the fourth tab portion 400 is formed to be lower by one step than the upper face of the annular convex portion 42.

Incidentally, in the explanation of the present embodiment, regarding the same structure as the first embodiment previously explained with FIGS. 1 to 10, and as the third embodiment previously explained with FIGS. 24 and 25, the explanation is omitted using the same reference numbers and alphabets.

Figure 32:
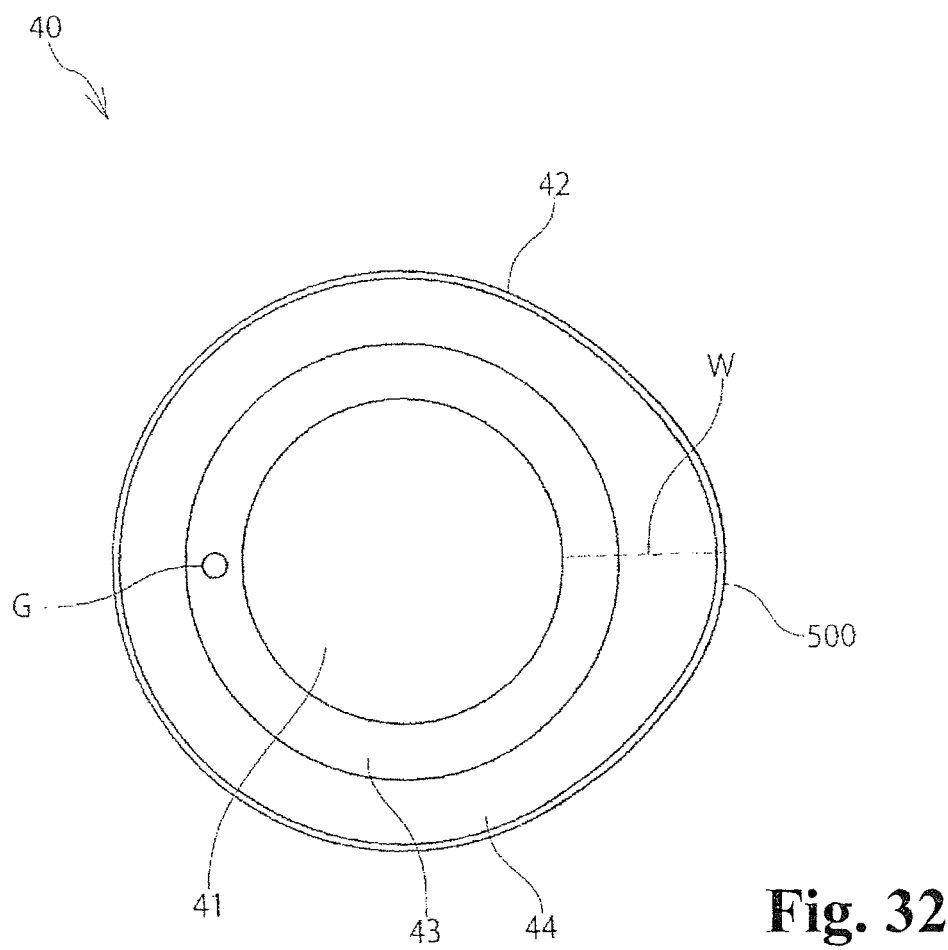
FIG. 32 shows a sixth embodiment of the present invention, and is a plan view of the meltable member.
Figure 33:
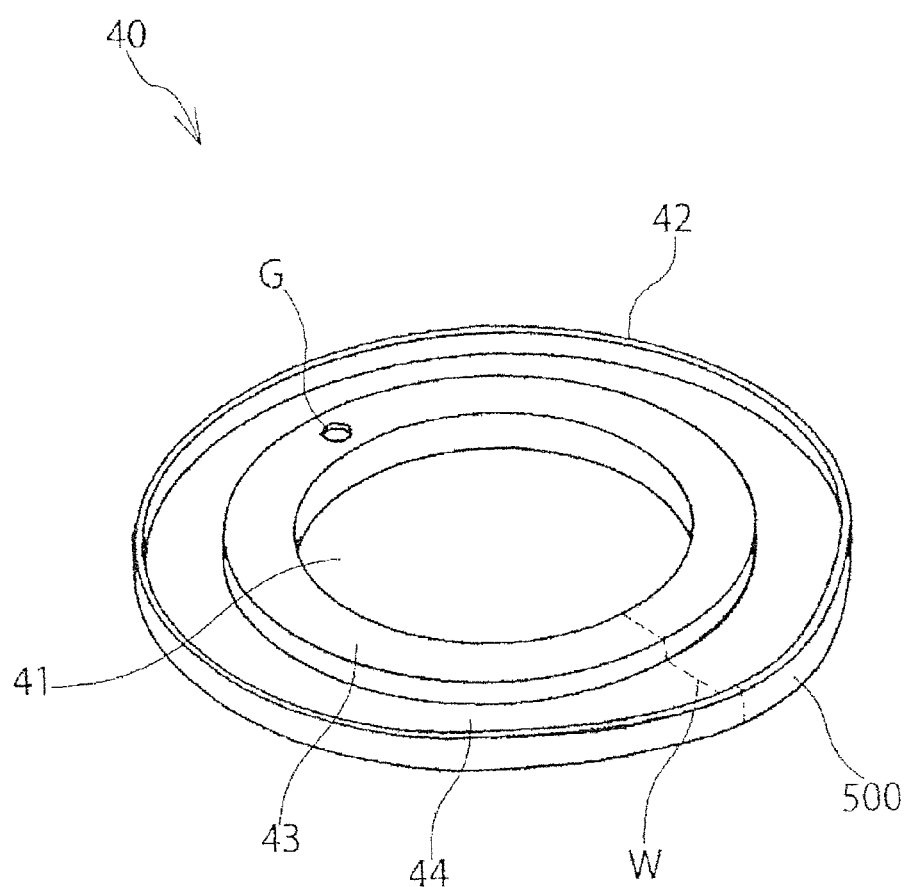
FIG. 33 is a perspective view of FIG. 32.

Sixth Embodiment in FIGS. 32 and 33

With reference to FIGS. 32 and 33, a sixth embodiment of the present invention will be explained.

The present embodiment relates to an improvement of the meltable member 40.

Namely, first, a characteristic of the present embodiment is that as shown in FIGS. 32 and 33, a fifth tab portion 500 is formed in the annular convex portion 42 of the meltable member 40, which is positioned on the extension line of the weld line W, and projects outward in the radial direction from the outer periphery of the meltable member 40.

Secondly, a characteristic of the present embodiment is that as shown in FIGS. 32 and 33, an outer periphery of the fifth tab portion 500 is positioned along the tangent of the outer periphery of the meltable member 40.

Thirdly, a characteristic of the present embodiment is that as shown in FIGS. 32 and 33, a thickness of the fifth tab portion 500 conforms to the thickness of the annular convex portion 42.

According to the present embodiment, the fifth tab portion 500 projecting outward in the radial direction from the outer periphery of the meltable member 40 is formed in the annular convex portion 42 so as to improve the strength at the portion where the weld line W is located.

Especially, according to the present embodiment, the fifth tab portion 500 is formed in the annular convex portion 42 so as to form the annular convex portion 42 and the fifth tab portion 500 continuously and integrally.

Specifically, as shown in FIGS. 32 and 33, the fifth tab portion 500 is positioned at one portion of the annular convex portion 42, and is formed by curving the outer periphery of the annular convex portion 42 in such a way as to project the outer periphery of the annular convex portion 42 along the tangent of the outer periphery of the meltable member 40.

Incidentally, in the explanation of the present embodiment, regarding the same structure as the first embodiment previously explained with FIGS. 1 to 10, and as the third embodiment previously explained with FIGS. 24 and 25, the explanation is omitted using the same reference numbers and alphabets.

Figure 34:
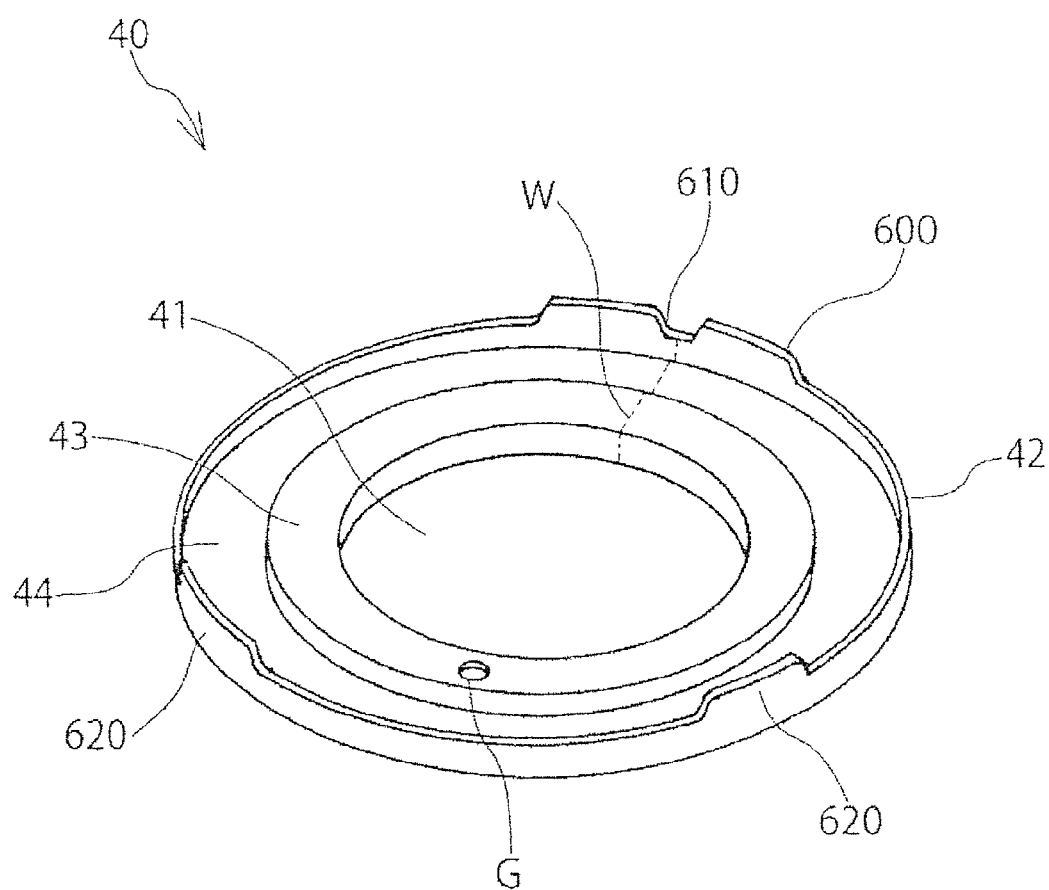
FIG. 34 shows a seventh embodiment of the present invention, and is a perspective view of the meltable member.

Seventh Embodiment in FIG. 34

With reference to FIG. 34, a seventh embodiment of the present invention will be explained.

The present embodiment relates to an improvement of the meltable member 40, and relates to the improvement of the third tab portion 300 according to the fourth embodiment previously explained with reference to FIGS. 26 to 29.

Namely, first, a characteristic of the present embodiment is that as shown in FIG. 34, there is formed a sixth tab portion 600 positioned on the extension line of the weld line W, projecting from the annular convex portion 42, and extending in the projection direction of the annular convex portion 42.

Secondly, a characteristic of the present embodiment is that as shown in FIG. 34, there is formed a concave portion 610 in the sixth tab portion 600, which is positioned on the extension line of the weld line W, and is concaved to be lower.

According to the embodiment, the concave portion 610 concaved to be lower is formed in the sixth tab portion 600 so as to reduce a quantity of a resin to be used for the sixth tab portion 600.

Specifically, as shown in FIG. 34, the sixth tab portion 600 is positioned on the extension line of the weld line W, and projects upward from the upper edge portion of the annular convex portion 42 in a tongue piece shape. In the sixth tab portion 600, a side face is formed approximately in a rectangular shape around the weld line W, and a thickness thereof approximately conforms to the thickness of the annular convex portion 42.

Also, as shown in FIG. 34, in the meltable member 40, in addition to the sixth tab portion 600, there is formed a plurality of auxiliary tab portions 620 at positions away from the sixth tab portion 600. Two auxiliary tab portions 620 are formed away from the sixth tab portion 600 at an interval of 120 degrees, respectively. A side face of the auxiliary tab portion 620 is formed approximately in a rectangular shape as with the sixth tab portion 600, and a thickness thereof approximately conforms to the thickness of the annular convex portion 42.

As a result, there are formed three tab portions in total by adding two auxiliary tab portions 620 to one sixth tab portion 600.

Incidentally, two auxiliary tab portions 620 are formed; however, they are not limited to the above, and all of the two auxiliary tab portions 620 may be omitted, or one or three or more auxiliary tab portions 620 may be formed.

Also, in the explanation of the present embodiment, regarding the same structure as the first embodiment previously explained with FIGS. 1 to 10, and as the third embodiment previously explained with FIGS. 24 and 25, the explanation is omitted using the same reference numbers and alphabets.

Figure 35:
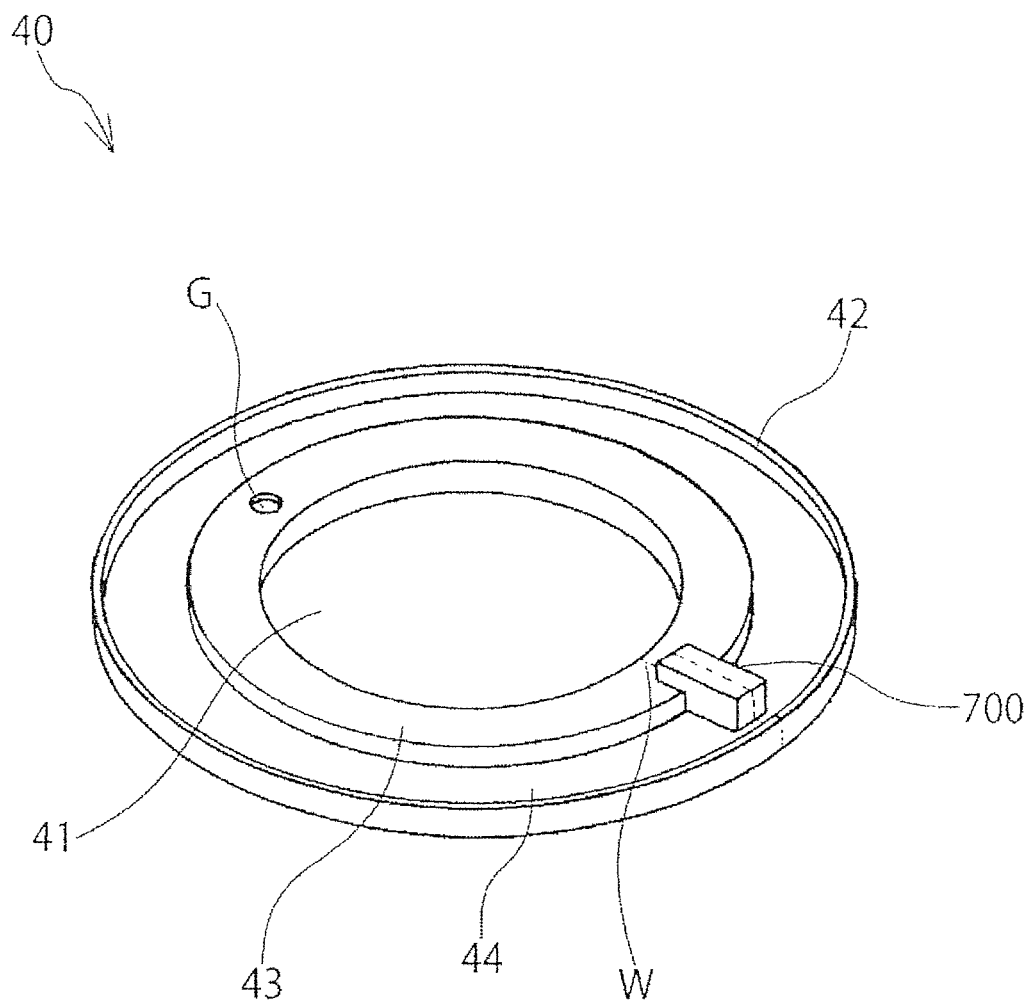
FIG. 35 shows an eighth embodiment of the present invention, and is a perspective view of the meltable member.
Figure 36:
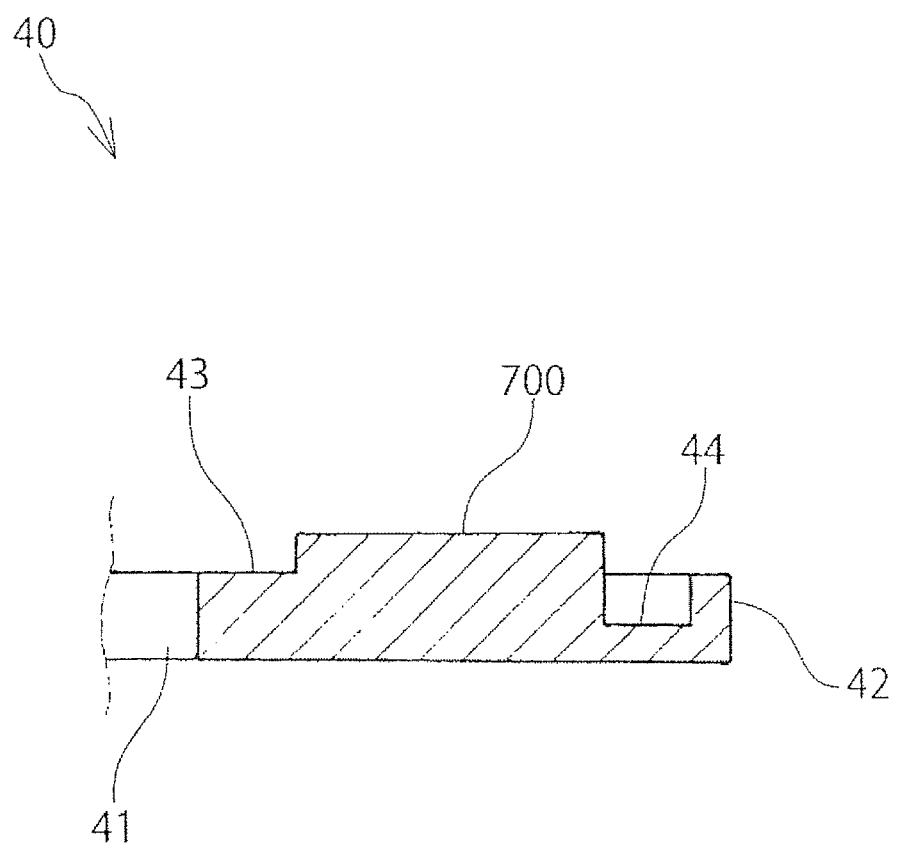
FIG. 36 is a cross-section of one portion approximately taken along a weld line in FIG. 35.

Eighth Embodiment in FIGS. 35 and 36

With FIGS. 35 and 36, an eighth embodiment of the present invention will be explained.

The present embodiment relates to an improvement of the meltable member 40.

Namely, a characteristic of the present embodiment is that as shown in FIGS. 35 and 36, there is formed a seventh tab portion 700 positioned on the extension line of the weld line W, and raised in the thickness direction from an upper face of the meltable member 40.

According to the present embodiment, there is formed the seventh tab portion 700 raised in the thickness direction from the upper face of the meltable member 40 so as to improve the strength at the portion where the weld line W is located.

Especially, according to the present embodiment, the seventh tab portion 700 is formed on the upper face of the meltable member 40 so as to improve a degree of freedom in design of the seventh tab portion 700.

Specifically, as shown in FIGS. 35 and 36, the seventh tab portion 700 is positioned along the weld line W and across the inner peripheral portion 43 and the depression portion 44, and is raised upward approximately in a block shape. The inner peripheral portion 43 is raised, and the depression portion 44 is lowered, so that a cross-sectional face of the seventh tab portion 700 is bent approximately in an L shape from a side view.

Incidentally, in the explanation of the present embodiment, regarding the same structure as the first embodiment previously explained with FIGS. 1 to 10, and as the third embodiment previously explained with FIGS. 24 and 25, the explanation is omitted using the same reference numbers and alphabets.

All contents of the specifications, claims, drawings, and abstracts of Japanese Patent Applications No. 2012-168542 filed on Jul. 30, 2012 and No. 2012-195585 filed on Sep. 5, 2012 are cited in their entireties herein and are incorporated as a disclosure of the specification of the present invention.

What is claimed is:

1. A hole plug, comprising:
a plug main body including:
   a head portion having a diameter adapted to be larger than that of an opening portion formed in a panel;
   a leg portion including a cylindrical portion extending downwardly from the head portion and having a diameter adapted to pass through the opening portion, a locking piece extending annularly upwardly toward the head portion from a lower portion of the cylindrical portion and elastically inwardly deformed for passing the opening portion to be adapted to hold the panel between the head portion and the locking piece, and slits extending upwardly from a lower end of the leg portion toward the head portion to divide the lower portion of the cylindrical portion and dividing the locking piece into a plurality of divided pieces separating from each other; and
   a flange portion extending annularly downwardly from the head portion adapted to elastically sandwich the panel with the locking piece; and
a meltable member annularly fitted around a periphery of the leg portion and adapted to be located between the flange portion and the panel through elasticity of the meltable member and bending of the locking piece, and having an annular convex portion projecting annularly upwardly along an outer periphery of the meltable member and a depression portion annularly formed adjacent to and inside the annular convex portion on an upper surface thereof,
wherein the meltable member is held between the flange portion and the locking piece, and a tip portion of the flange portion is positioned apart inwardly from the convex portion in a radial direction of the meltable member in the depression portion when the meltable member is fitted with the plug main body, and when the meltable member is heated, the meltable member thermally shrinks to reduce a diameter toward a center of the opening portion, and melts and seals between the opening portion and the flange portion.

2. A hole plug according to claim 1, wherein the annular convex portion projects higher than the tip portion of the flange portion, and when the meltable member thermally shrinks, the annular convex portion is welded to the tip portion of the flange portion to wrap the tip portion of the flange portion inwardly in the radial direction from an outside of the flange portion.

3. A hole plug according to claim 1, wherein the flange portion has a suction disc form opening toward the panel, and
the flange portion includes at least an embossment portion where the meltable member is welded, at an inner peripheral face of the tip portion.

4. A hole plug according to claim 1, wherein the flange portion has a suction disc form opening toward the panel, and
the flange portion includes at least an embossment portion where the meltable member can be welded, on an outer peripheral face of the tip portion.

5. A hole plug according to claim 1, wherein the locking piece has a fold-back shape to form an umbrella shape opening toward the head portion, and
each of the plurality of divided pieces includes a notch portion penetrating between an inside and an outside of the locking piece.

6. A hole plug according to claim 5, wherein the notch portion includes a plurality of notch parts.

7. A hole plug according to claim 1, wherein the meltable member includes a center hole formed at a center portion thereof to have a doughnut shape, and an inner peripheral portion annularly formed around the center hole such that the depression portion is arranged between the convex portion and the inner peripheral portion, and
the inner peripheral portion has a height same as that of the convex portion.

8. A hole plug according to claim 7, wherein the tip portion of the flange portion is positioned apart inwardly from the convex portion to form a gap between an outer peripheral face of the tip portion and an inner peripheral face of the convex portion, in which the flange portion is allowed to be bent, and the plurality of divided pieces supports a rear surface of the inner peripheral portion of the meltable member, and the tip portion of the flange portion is disposed on an upper surface of the depression portion inwardly apart from the convex portion such that the meltable member is contacted to the flange portion and the locking piece to be held between the flange portion and the locking piece.

9. A combination comprising:
the hole plug according to claim 1, and
the panel including the opening portion,
wherein the meltable member includes a center hole formed at a center portion hereof, and
the panel is fitted with the plug main body to correspond the opening portion and the center portion.

10. A hole plug according to claim 1, wherein the flange portion extends downwardly and contacts the meltable member at the tip portion thereof to form a space between the flange portion and the meltable member, the space having a height narrower in a radial direction of the meltable member.

11. A hole plug according to claim 1, wherein each of the plurality of divided pieces includes a notch portion extending from a lower end of the locking piece toward an upper end thereof.

12. A hole plug according to claim 11, wherein the plurality of divided pieces is arranged apart from each other only through the slits, and the notch portion includes two notch parts formed apart from each other in a circumferential direction of the locking piece and having square shapes.

13. A hole plug according to claim 1, wherein the slits extend to a middle of the cylindrical portion without completely extending to the head portion.

* * * * *